United States Patent
Aldana et al.

(10) Patent No.: US 11,846,717 B2
(45) Date of Patent: Dec. 19, 2023

(54) SYSTEMS AND METHODS OF ANGLE-OF-ARRIVAL DETERMINATION IN WIRELESS DEVICES

(71) Applicant: Meta Platforms Technologies, LLC, Menlo Park, CA (US)

(72) Inventors: Carlos Horacio Aldana, Mountain View, CA (US); Ardavan Maleki Tehrani, Stanford, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 31 days.

(21) Appl. No.: 17/538,339

(22) Filed: Nov. 30, 2021

(65) Prior Publication Data

US 2023/0168336 A1    Jun. 1, 2023

(51) Int. Cl.
*G01S 5/06* (2006.01)
*G01S 5/14* (2006.01)
*G01S 5/02* (2010.01)
*H01Q 5/25* (2015.01)

(52) U.S. Cl.
CPC .............. *G01S 5/0294* (2013.01); *G01S 5/06* (2013.01); *G01S 5/14* (2013.01); *H01Q 5/25* (2015.01)

(58) Field of Classification Search
CPC ............ G01S 5/0294; G01S 5/06; G01S 5/14; H01Q 5/25
USPC ........................................................ 342/407
See application file for complete search history.

(56) References Cited

U.S. PATENT DOCUMENTS 11,590,403 B2 *  2/2023  Park ...................... G01S 19/19

FOREIGN PATENT DOCUMENTS

| CN | 113514794 A | * | 10/2021 |
| EP | 3882662 A1 | | 9/2021 |
| WO | 2014007754 A2 | | 1/2014 |
| WO | 2017019570 A1 | | 2/2017 |
| WO | WO-2022012721 A2 | * | 1/2022 |

OTHER PUBLICATIONS

Yongtao Ma, May 21, 2018, IEEE Access, Digital Object Identifier 10.1109/ACCESS.2018.2838590,p. 1 Abstract.*
International Search Report and Written Opinion for International Application No. PCT/US2022/051009, dated Mar. 16, 2023, 10 pages.

* cited by examiner

*Primary Examiner* — Harry K Liu
(74) *Attorney, Agent, or Firm* — Foley & Lardner LLP

(57) ABSTRACT

Systems and methods for angle of arrival determination in wireless devices include one or more processors which determine a first angle of arrival (AoA) and a first distance between a user device and an anchor device at a first time instance, according to first measurements between a single ultra-wideband (UWB) antenna of the user device and a plurality of UWB antennas of the anchor device. The processor(s) may determine a second AoA and a second distance between the user device and the anchor device at a second time instance, according to second measurements between the single UWB antenna of the user device and the plurality of UWB antennas of the anchor device. The processor(s) may determine a direction of movement of the user device relative to the anchor device, according to the first AoA, the first distance, the second AoA, and the second distance.

20 Claims, 14 Drawing Sheets

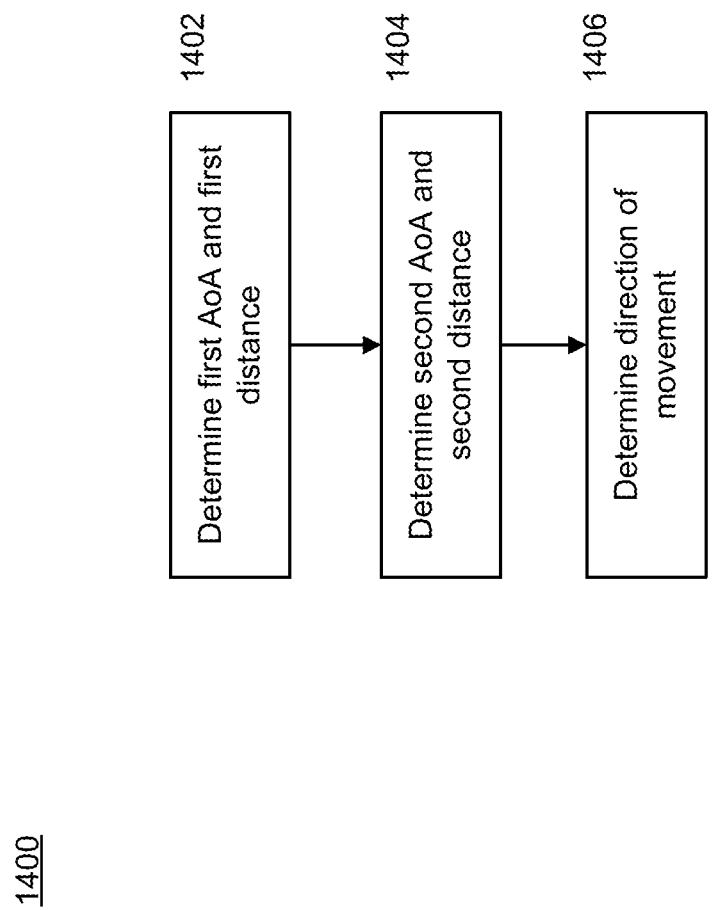

SYSTEMS AND METHODS OF ANGLE-OF-ARRIVAL DETERMINATION IN WIRELESS DEVICES

BACKGROUND

The development of ultra-wideband devices has shown promise in determining accurate ranging between devices. However, to determine angle of arrival, a device typically would require multiple UWB antennas, which can be cost prohibitive and also may not be feasible given size constraints of a given device.

SUMMARY

In one aspect, this disclosure is directed to a method. The method may include determining, by one or more processors, a first angle of arrival (AoA) and a first distance between a user device and an anchor device at a first time instance, according to first measurements between a single ultra-wideband (UWB) antenna of the user device and a plurality of UWB antennas of the anchor device. The method may include determining, by the one or more processors, a second AoA and a second distance between the user device and the anchor device at a second time instance, according to second measurements between the single UWB antenna of the user device and the plurality of UWB antennas of the anchor device. The method may include determining, by the one or more processors, a direction of movement of the user device relative to the anchor device, according to the first AoA, the first distance, the second AoA, and the second distance.

In some embodiments, the method further includes providing, by the one or more processors, a navigational instruction for navigating towards the anchor device, according to the determined direction of movement. In some embodiments, the anchor device comprises the one or more processors, or the user device comprises the one or more processors. In some embodiments, the anchor device is stationary. In some embodiments, the method further includes determining, by the one or more processors, a value indicative of the direction of movement, according to a change between the first AoA and the second AoA. In some embodiments, the method further includes determining, by the one or more processors, an angle from the user device towards the anchor device according to the direction of movement.

In some embodiments, the method further includes receiving, by the one or more processors, third measurements at a third time instance between the first time instance and the second instance. The method may further include determining, by the one or more processors, that a signal strength from the third measurements is lower than that from at least one of the first measurements or the second measurements, by at least a defined amount. The method may further include discarding, by the one or more processors, the third measurements responsive to determining that the signal strength is lower by at least the defined amount. In some embodiments, the method further includes determining, by the one or more processors according to the first measurements, a first candidate AoA and a second candidate AoA corresponding to different UWB signal paths. The method may further include determining, by the one or more processors, a first time difference of arrival (TDOA) corresponding to the first candidate AoA, and a second TDOA corresponding to the second candidate AoA. The method may further include determining, by the one or more processors, the first AoA, by selecting the first candidate AoA or the second candidate AoA according to the first TDOA and the second TDOA. In some embodiments, determining the first TDOA includes determining, by the one or more processors, an average of at least two TDOA values corresponding to the first candidate AoA. In some embodiments, the direction of movement is a first direction of movement, and the anchor device is a first anchor device, and the method further includes determining, by the one or more processors, a second direction of movement of the user device relative to a second anchor device located apart from the first anchor device. The method may further include determining, by the one or more processors, an angle from the user device towards the first anchor device and the second anchor device, by calculating a weighted average of a first angle and a second angle corresponding to the first and second directions of movement respectively, or selecting one of the first angle and the second angle.

In another aspect, this disclosure is directed to a user device. The user device may include a single ultra-wideband (UWB) antenna. The user device may include one or more processors configured to determine a first angle of arrival (AoA) and a first distance between the user device and an anchor device at a first time instance, according to first measurements between the single UWB antenna and a plurality of UWB antennas of the anchor device. The one or more processors may further be configured to determine a second AoA and a second distance between the user device and the anchor device at a second time instance, according to second measurements between the single UWB antenna and the plurality of UWB antennas of the anchor device. The one or more processors may further be configured to determine a direction of movement of the user device relative to the anchor device, according to the first AoA, the first distance, the second AoA, and the second distance.

In some embodiments, the one or more processors are further configured to provide a navigational instruction for navigating towards the anchor device, according to the determined direction of movement. In some embodiments, the one or more processors are further configured to determine a value indicative of the direction of movement according to a change between the first AoA and the second AoA. In some embodiments, the one or more processors are further configured to determine an angle from the user device towards the anchor device according to the direction of movement. In some embodiments, the one or more processors are further configured to receive third measurements at a third time instance between the first time instance and the second instance, determine that a signal strength from the third measurements is lower than that from at least one of the first measurements or the second measurements, by at least a defined amount, and discard the third measurements responsive to determining that the signal strength is lower by at least the defined amount.

In some embodiments, the one or more processors are further configured to determine, according to the first measurements, a first candidate AoA and a second candidate AoA corresponding to different UWB signal paths, determine a first time difference of arrival (TDOA) corresponding to the first candidate AoA, and a second TDOA corresponding to the second candidate AoA, and determine the first AoA, by selecting the first candidate AoA or the second candidate AoA according to the first TDOA and the second TDOA. In some embodiments, the one or more processors are further configured to determine the first TDOA by: determining an average of at least two TDOA values corresponding to the first candidate AoA. In some embodiments, the direction of movement is a first direction of movement and the anchor device is a first anchor device. The one or more processors may be further configured to determine a second direction of movement of the user device relative to a second anchor device located apart from the first anchor device, and determine an angle from the user device towards the first anchor device and the second anchor device, by calculating a weighted average of a first angle and a second angle corresponding to the first and second directions of movement respectively, or selecting one of the first angle and the second angle.

In yet another aspect, this disclosure is directed to a non-transitory computer readable medium storing instructions that, when executed by one or more processors, cause the one or more processors to determine a first angle of arrival (AoA) and a first distance between a user device and an anchor device at a first time instance, according to first measurements between the single ultra-wideband (UWB) antenna of the user device and a plurality of UWB antennas of the anchor device. The instructions may further cause the one or more processors to determine a second AoA and a second distance between the user device and the anchor device at a second time instance, according to second measurements between the single UWB antenna of the user device and the plurality of UWB antennas of the anchor device. The instructions may further cause the one or more processors to determine a direction of movement of the user device relative to the anchor device, according to the first AoA, the first distance, the second AoA, and the second distance.

In some embodiments, the instructions further cause the one or more processors to provide a navigational instruction for navigating towards the anchor device, according to the determined direction of movement.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 14 is a flowchart showing a method of angle-of-arrival determination in wireless devices, according to an example implementation of the present disclosure.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are embodiments related to devices operating in the ultra-wideband (UWB) spectrum. In various embodiments, UWB devices may operate in the 3-10 GHz unlicensed spectrum, for example, and may use 500+ MHz channels. These channels may require low power for transmission. For example, the transmit power spectral density (PSD) for some devices may be limited to −41.3 dBm/MHz. On the other hand, UWB may have transmit PSD values in the range of −5 to +5 dBm/MHz range, averaged over 1 ms, with a peak power limit of 0 dBm in a given 50 MHz band. Using simple modulation and spread spectrum, UWB devices may achieve reasonable resistance to Wi-Fi and Bluetooth interference (as well as resistance to interference with other UWB devices within a shared or common environment) for very low data rates (e.g., 10 s to 100 s Kbps) and may have large processing gains. However, for higher data rates (e.g., several Mbps), the processing gains may not be sufficient to overcome co-channel interference from Wi-Fi or Bluetooth. According to the embodiments described herein, the systems and methods described herein may operate in frequency bands that do not overlap with Wi-Fi and Bluetooth, but may have good global availability based on regulatory requirements. Since regulatory requirements make the 7-8 GHz spectrum the most widely available globally (and Wi-Fi is not present in this spectrum), the 7-8 GHz spectrum may operate satisfactory both based on co-channel interference and processing gains.

Some implementations of UWB may focus on precision ranging, security, and low to moderate rate data communication. As UWB employs relatively simple modulation, it may be implemented at low cost and low power consumption. In AR/VR applications, link budget calculations for an AR/VR controller link indicate that the systems and methods described herein may be configured for effective data throughput ranging from ~2 to 31 Mbps (e.g., with 31 Mbps being the maximum possible rate in the latest 802.15.4z standard), which may depend on body loss assumptions. Using conservative body loss assumptions, the systems and methods described herein should be configured for data throughput of up to approximately 5 Mbps, which may be sufficient to meet the data throughput performance standards for AR/VR links. With a customized implementation, data throughput rate could be increased beyond 27 Mbps (e.g., to 54 Mbps), but with possible loss in link margin.

Figure 1:
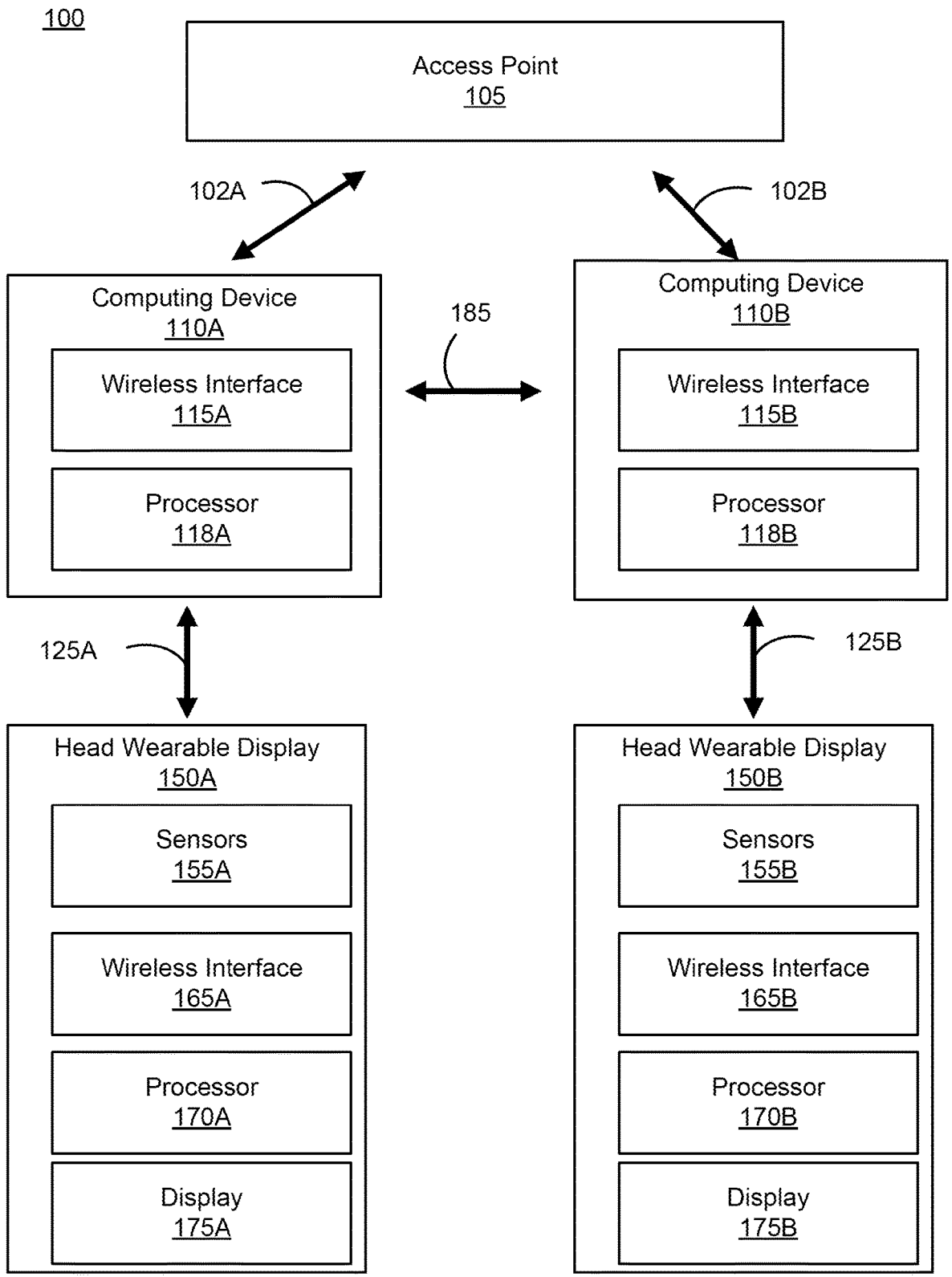
FIG. 1 is a diagram of a system environment including an artificial reality system, according to an example implementation of the present disclosure.
Figure 2:
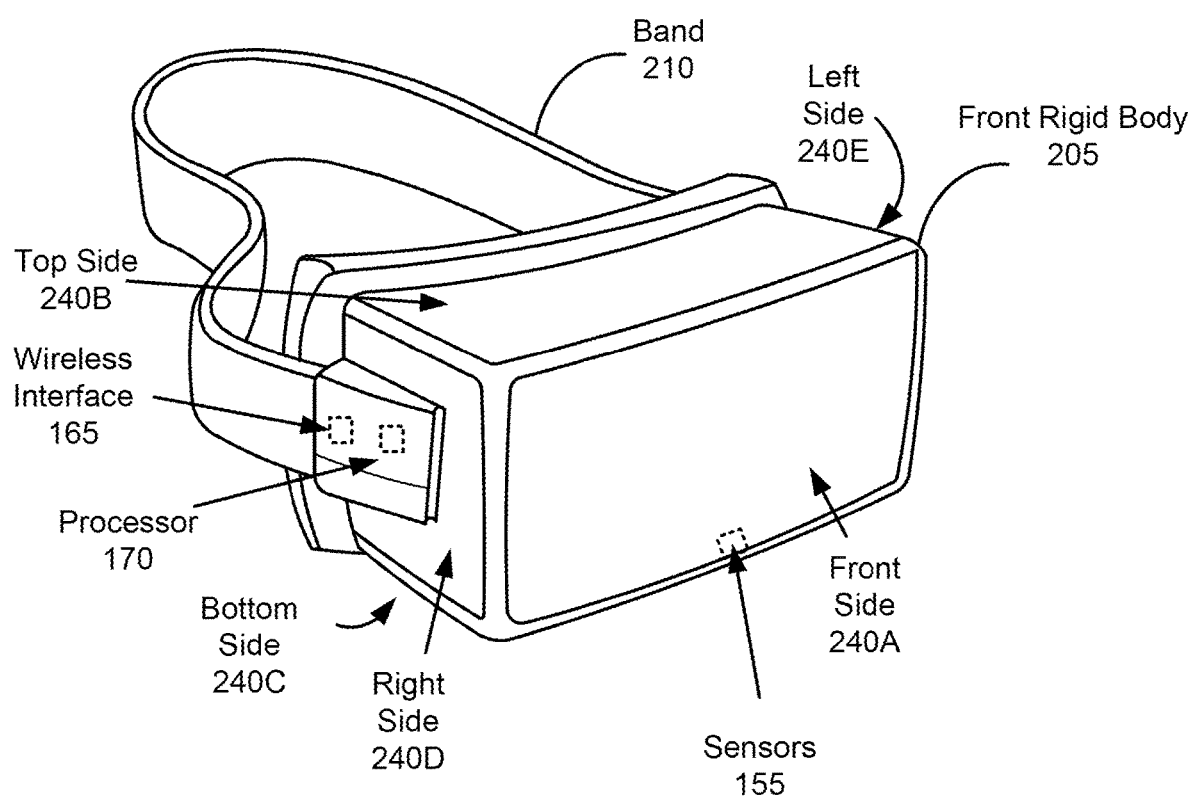
FIG. 2 is a diagram of a head wearable display, according to an example implementation of the present disclosure.

FIG. 1 is a block diagram of an example artificial reality system environment 100. In some embodiments, the artificial reality system environment 100 includes an access point (AP) 105, one or more HWDs 150 (e.g., HWD 150A, 150B), and one or more computing devices 110 (computing devices 110A, 110B; sometimes referred to as stage devices or consoles) providing data for artificial reality to the one or more HWDs 150. The access point 105 may be a router or any network device allowing one or more computing devices 110 and/or one or more HWDs 150 to access a network (e.g., the Internet). The access point 105 may be replaced by any communication device (cell site). A computing device 110 may be a custom device or a mobile device that can retrieve content from the access point 105, and provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. For example, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. In some embodiments, the wireless link 125 may include one or more ultra-wideband communication links, as described in greater detail below. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, ultra-wideband link, or any wireless communication link. The wireless interface 115 may also include a component to communicate with a different computing device 110 through a wireless link 185. Examples of the wireless link 185 include a near field communication link, Wi-Fi direct, Bluetooth, ultra-wideband link, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118, 170 may configure or cause the wireless interfaces 115, 165 to toggle, transition, cycle or switch between a sleep mode and a wake up mode. In the wake up mode, the processor 118 may enable the wireless interface 115 and the processor 170 may enable the wireless interface 165, such that the wireless interfaces 115, 165 may exchange data. In the sleep mode, the processor 118 may disable (e.g., implement low power operation in) the wireless interface 115 and the processor 170 may disable the wireless interface 165, such that the wireless interfaces 115, 165 may not consume power or may reduce power consumption. The processors 118, 170 may schedule the wireless interfaces 115, 165 to switch between the sleep mode and the wake up mode periodically every frame time (e.g., 11 ms or 16 ms). For example, the wireless interfaces 115, 165 may operate in the wake up mode for 2 ms of the frame time, and the wireless interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced.

In various embodiments, the devices in the environments described above may operate or otherwise use components which leverage communications in the ultra-wideband (UWB) spectrum. In various embodiments, UWB devices operate in the 3-10 GHz unlicensed spectrum using 500+ MHz channels which may require low power for transmission. For example, the transmit power spectral density (PSD) for some systems may be limited to −41.3 dBm/MHz. On the other hand, UWB may have transmit PSD values in the range of −5 to +5 dBm/MHz range, averaged over 1 ms, with a peak power limit of 0 dBm in a given 50 MHz band. Using simple modulation and spread spectrum, UWB devices may achieve reasonable resistance to Wi-Fi and Bluetooth interference (as well as resistance to interference with other UWB devices located in the environment) for very low data rates (e.g., 10 s to 100 s Kbps) and may have large processing gains. However, for higher data rates (e.g., several Mbps), the processing gains may not be sufficient to overcome co-channel interference from Wi-Fi or Bluetooth. According to the embodiments described herein, the systems and methods described herein may operate in frequency bands that do not overlap with Wi-Fi and Bluetooth, but may have good global availability based on regulatory requirements. Since regulatory requirements make the 7-8 GHz spectrum the most widely available globally (and Wi-Fi is not present in this spectrum), the 7-8 GHz spectrum may operate satisfactory both based on co-channel interference and processing gains.

Figure 3:
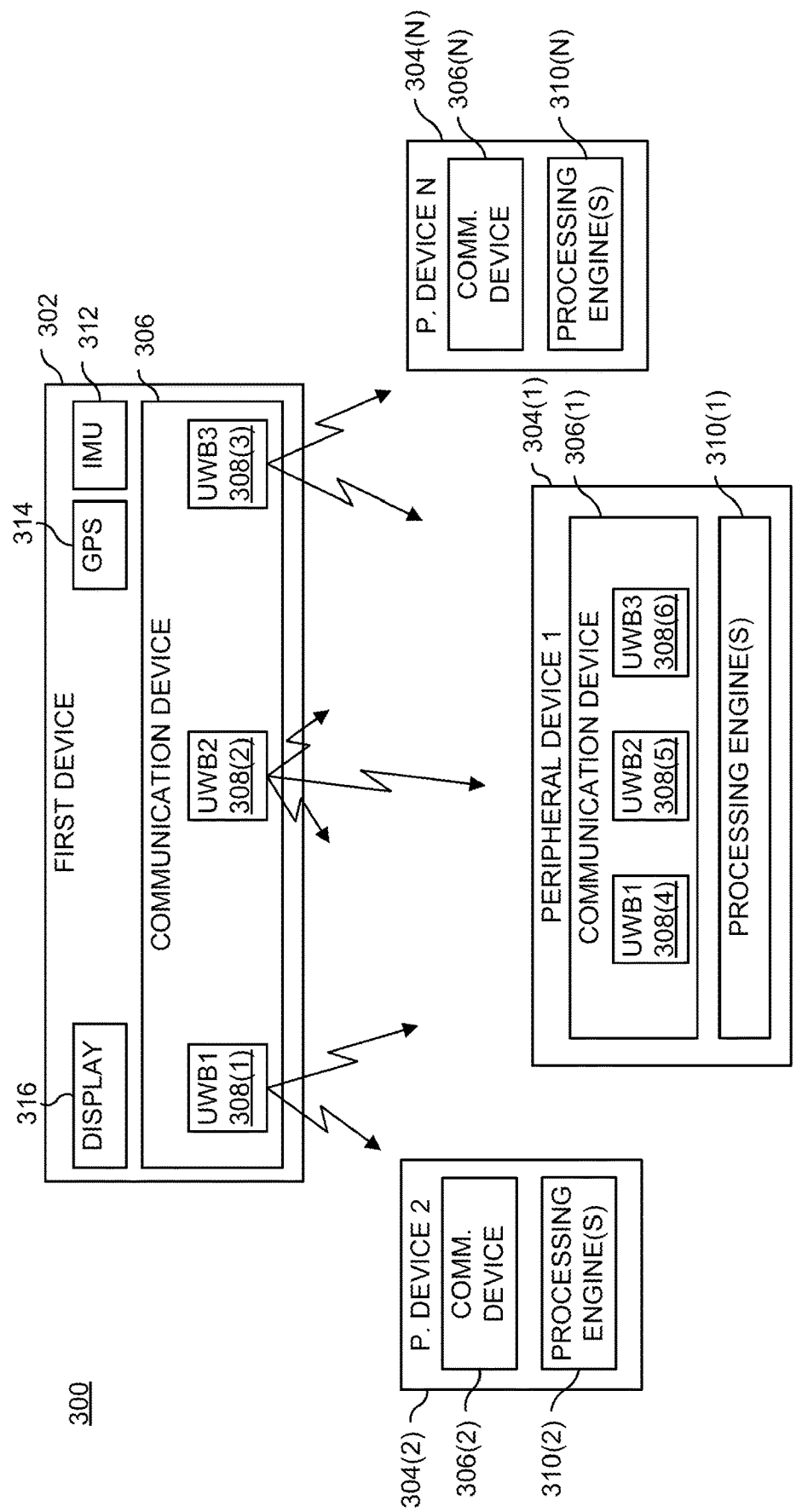
FIG. 3 is a block diagram of an artificial reality environment, according to an example implementation of the present disclosure.

Some implementations of UWB may focus on precision ranging, security, and for low-to-moderate rate data communication. As UWB employs relatively simple modulation, it may be implemented at low cost and low power consumption. In AR/VR applications (or in other applications and use cases), link budget calculations for an AR/VR controller link indicate that the systems and methods described herein may be configured for effective data throughput ranging from to 31 Mbps (e.g., with 31 Mbps being the maximum possible rate in the latest 802.15.4z standard), which may depend on body loss assumptions Referring now to FIG. 3, depicted is a block diagram of an artificial reality environment 300. The artificial reality environment 300 is shown to include a first device 302 and one or more peripheral devices 304(1)-304(N) (also referred to as "peripheral device 304" or "device 304"). The first device 302 and peripheral device(s) 304 may each include a communication device 306 including a plurality of UWB devices 308. A set of UWB devices 308 may be spatially positioned/located (e.g., spaced out) relative to each other on different locations on/in the first device 302 or the peripheral device 304, so as to maximize UWB coverage and/or to enhance/enable specific functionalities. The UWB devices 308 may be or include antennas, sensors, or other devices and components designed or implemented to transmit and receive data or signals in the UWB spectrum (e.g., between 3.1 GHz and 10.6 GHz) and/or using UWB communication protocol. In some embodiments, one or more of the devices 302, 304 may include various processing engines 310. The processing engines 310 may be or include any device, component, machine, or other combination of hardware and software designed or implemented to control the devices 302, 304 based on UWB signals transmitted and/or received by the respective UWB devices 308.

As noted above, the environment 300 may include a first device 302. The first device 302 may be or include a wearable device, such as the HWD 150 described above, a smart watch, AR glasses, or the like. In some embodiments, the first device 302 may include a mobile device (e.g., a smart phone, tablet, stage/console device, or other computing device). The first device 302 may be communicably coupled with various other devices 304 located in the environment 300. For example, the first device 302 may be communicably coupled to one or more of the peripheral devices 304 located in the environment 300. The peripheral devices 304 may be or include the computing device 110 described above, a device similar to the first device 302 (e.g., a HWD 150, a smart watch, mobile device, etc.), an automobile or other vehicle, a beacon transmitting device located in the environment 300, a smart home device (e.g., a smart television, a digital assistant device, a smart speaker, etc.), a smart tag configured for positioning on various devices, etc. In some embodiments, the first device 302 may be associated with a first entity or user and the peripheral devices 304 may be associated with a second entity or user (e.g., a separate member of a household, or a person/entity unrelated to the first entity).

In some embodiments, the first device 302 may be communicably coupled with the peripheral device(s) 304 following a pairing or handshaking process. For example, the first device 302 may be configured to exchange handshake packet(s) with the peripheral device(s) 304, to pair (e.g., establish a specific or dedicated connection or link between) the first device 302 and the peripheral device 304. The handshake packet(s) may be exchanged via the UWB devices 308, or via another wireless link 125 (such as one or more of the wireless links 125 described above). Following pairing, the first device 302 and peripheral device(s) 304 may be configured to transmit, receive, or otherwise exchange UWB data or UWB signals using the respective UWB devices 308 on the first device 302 and/or peripheral device 304. In some embodiments, the first device 302 may be configured to establish a communications link with a peripheral device 304 (e.g., without any device pairing). For example, the first device 302 may be configured to detect, monitor, and/or identify peripheral devices 304 located in the environment using UWB signals received from the peripheral devices 304 within a certain distance of the first device 302, by identifying peripheral devices 304 which are connected to a shared Wi-Fi network (e.g., the same Wi-Fi network to which the first device 302 is connected), etc. In these and other embodiments, the first device 302 may be configured to transmit, send, receive, or otherwise exchange UWB data or signals with the peripheral device 304.

Figure 4:
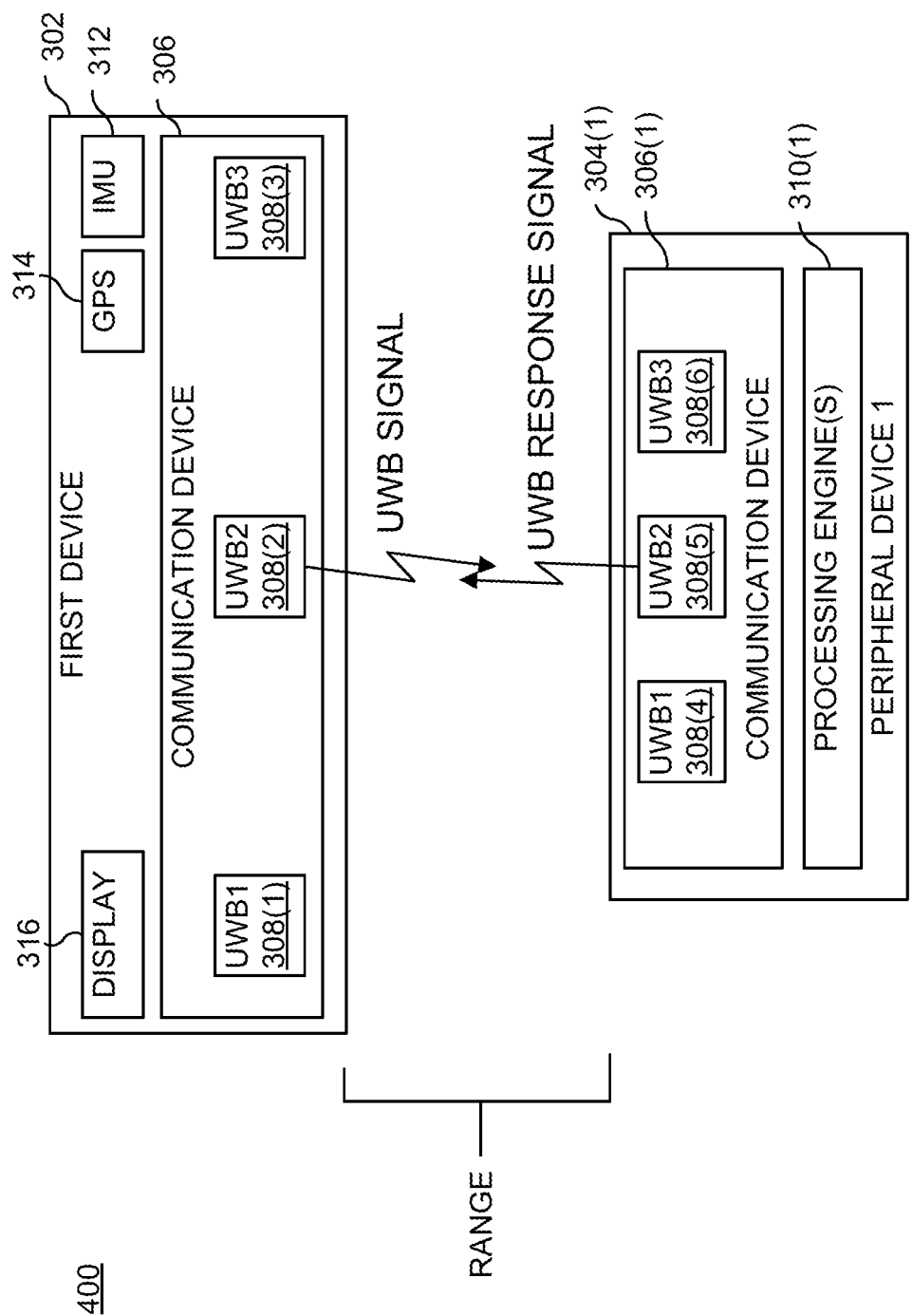
FIG. 4 is a block diagram of another artificial reality environment, according to an example implementation of the present disclosure.

Referring now to FIG. 4, depicted is a block diagram of an environment 400 including the first device 302 and a peripheral device 304. The first device 302 and/or the peripheral device 304 may be configured to determine a range (e.g., a spatial distance, separation) between the devices 302, 304. The first device 302 may be configured to send, broadcast, or otherwise transmit a UWB signal (e.g., a challenge signal). The first device 302 may transmit the UWB signal using one of the UWB devices 308 of the communication device 306 on the first device 302. The UWB device 308 may transmit the UWB signal in the UWB spectrum. The UWB signal may have a high bandwidth (e.g., 500 MHz). As such, the UWB device 308 may be configured to transmit the UWB signal in the UWB spectrum (e.g., between 3.1 GHz and 10.6 GHz) and having a high bandwidth (e.g., 500 MHz). The UWB signal from the first device 302 may be detectable by other devices within a certain range of the first device 302 (e.g., devices having a line of sight (LOS) within 200 m of the first device 302). As such, the UWB signal may be more accurate for detecting range between devices than other types of signals or ranging technology.

The peripheral device 304 may be configured to receive or otherwise detect the UWB signal from the first device 302. The peripheral device 304 may be configured to receive the UWB signal from the first device 302 via one of the UWB devices 308 on the peripheral device 304. The peripheral device 304 may be configured to broadcast, send, or otherwise transmit a UWB response signal responsive to detecting the UWB signal from the first device 302. The peripheral device 304 may be configured to transmit the UWB response signal using one of the UWB devices 308 of the communication device 306 on the peripheral device 304. The UWB response signal may be similar to the UWB signal sent from the first device 302.

The first device 302 may be configured to detect, compute, calculate, or otherwise determine a time of flight (TOF) based on the UWB signal and the UWB response signal. The TOF may be a time or duration between a time in which a signal (e.g., the UWB signal) is transmitted by the first device 302 and a time in which the signal is received by the peripheral device 304. The first device 302 and/or the peripheral device 304 may be configured to determine the TOF based on timestamps corresponding to the UWB signal. For example, the first device 302 and/or peripheral device 304 may be configured to exchange transmit and receive timestamps based on when the first device 302 transmits the UWB signal (a first TX timestamp), when the peripheral device receives the UWB signal (e.g., a first RX timestamp), when the peripheral device sends the UWB response signal (e.g., a second TX timestamp), and when the first device 302 receives the UWB response signal (e.g., a second RX timestamp). The first device 302 and/or the peripheral device 304 may be configured to determine the TOF based on a first time in which the first device 302 sent the UWB signal and a second time in which the first device 302 received the UWB response signal (e.g., from the peripheral device 304), as indicated by first and second TX and RX timestamps identified above. The first device 302 may be configured to determine or calculate the TOF between the first device 302 and the peripheral device 304 based on a difference between the first time and the second time (e.g., divided by two).

In some embodiments, the first device 302 may be configured to determine the range (or distance) between the first device 302 and the peripheral device 304 based on the TOF. For example, the first device 302 may be configured to compute the range or distance between the first device 302 and the peripheral device 304 by multiplying the TOF and the speed of light (e.g., TOF×c). In some embodiments, the peripheral device 304 (or another device in the environment 400) may be configured to compute the range or distance between the first device 302 and peripheral device 304. For example, the first device 302 may be configured to transmit, send, or otherwise provide the TOF to the peripheral device 304 (or other device), and the peripheral device 304 (or other device) may be configured to compute the range between the first device 302 and peripheral device 304 based on the TOF, as described above.

Figure 5:
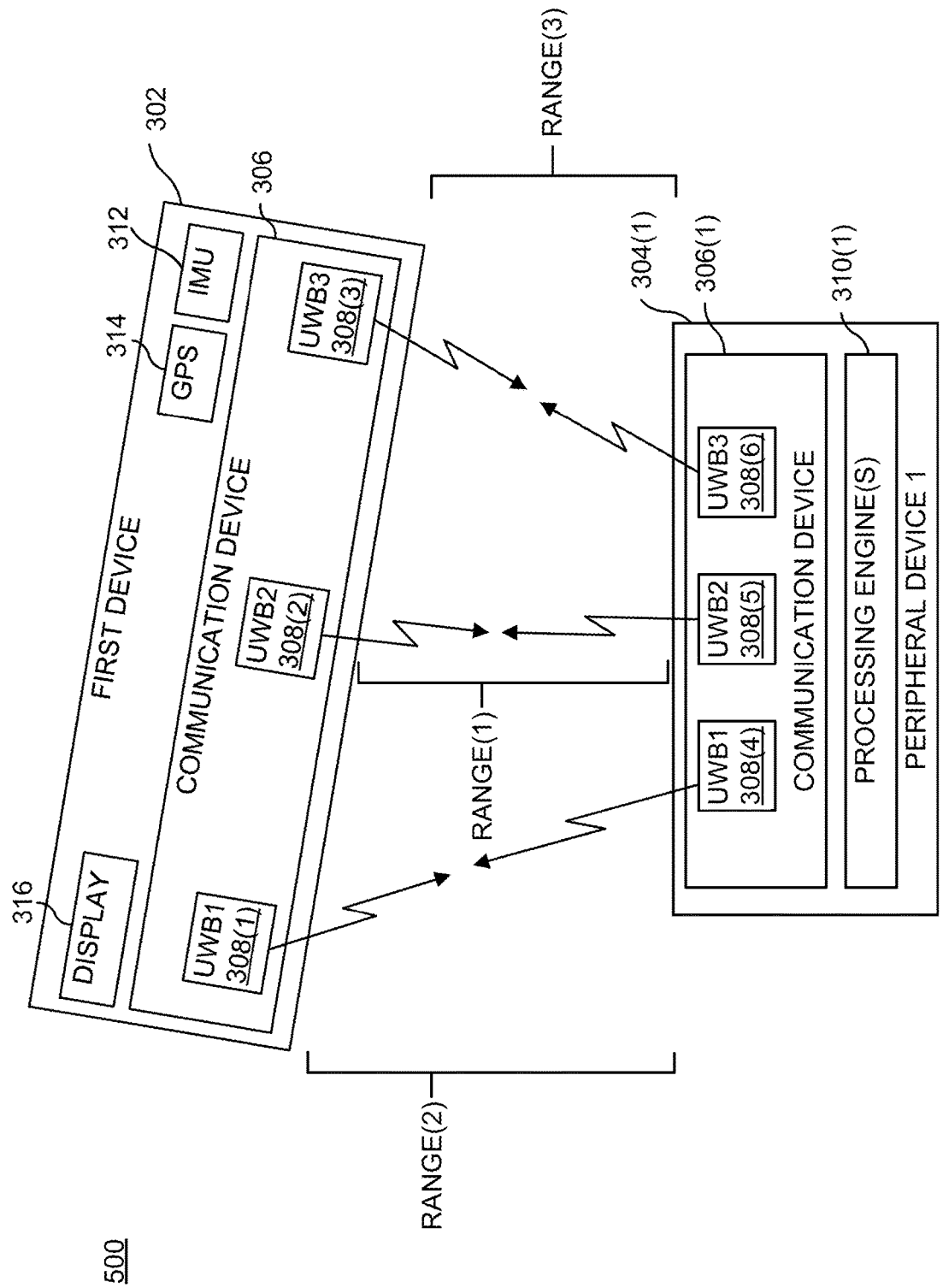
FIG. 5 is a block diagram of another artificial reality environment, according to an example implementation of the present disclosure.

Referring now to FIG. 5, depicted is a block diagram of an environment 500 including the first device 302 and a peripheral device 304. In some embodiments, the first device 302 and/or the peripheral device 304 may be configured to determine a position or pose (e.g., orientation) of the first device 302 relative to the peripheral device 304. The first device 302 and/or the peripheral device 304 may be configured to determine the relative position or orientation in a manner similar to determining the range as described above. For example, the first device 302 and/or the peripheral device 304 may be configured to determine a plurality of ranges (e.g., range(1), range(2), and range(3)) between the respective UWB devices 308 of the first device 302 and the peripheral device 304. In the environment 500 of FIG. 5, the first device 302 is positioned or oriented at an angle relative to the peripheral device 304. The first device 302 may be configured to compute the first range (range(1)) between central UWB devices 308(2), 308(5) of the first and peripheral device 304. The first range may be an absolute range or distance between the devices 302, 304, and may be computed as described above with respect to FIG. 4.

The first device 302 and/or the peripheral device 304 may be configured to compute the second range(2) and third range(3) similar to computing the range(1), In some embodiments, the first device 302 and/or the peripheral device 304 may be configured to determine additional ranges, such as a range between UWB device 308(1) of the first device 302 and UWB device 308(5) of the peripheral device 304, a range between UWB device 308(2) of the first device 302 and UWB device 308(6) of the peripheral device 304, and so forth. While described above as determining a range based on additional UWB signals, it is noted that, in some embodiments, the first device 302 and/or the peripheral device 304 may be configured to determine a phase difference between a UWB signal received at a first UWB device 308 and a second UWB device 308 (i.e., the same UWB signal received at separate UWB devices 308 on the same device 302, 304). The first device 302 and/or the peripheral device 304 may be configured to use each or a subset of the computed ranges (or phase differences) to determine the pose, position, orientation, etc. of the first device 302 relative to the peripheral device 304. For example, the first device and/or the peripheral device 304 may be configured to use one of the ranges relative to the first range(1) (or phase differences) to determine a yaw of the first device 302 relative to the peripheral device 304, another one of the ranges relative to the first range(1) (or phase differences) to determine a pitch of the first device 302 relative to the peripheral device 304, another one of the ranges relative to the first range(1) (or phase differences) to determine a roll of the first device 302 relative to the peripheral device 304, and so forth.

By using the UWB devices 308 at the first device 302 and peripheral devices 304, the range and pose may be determined with greater accuracy than other ranging/wireless link technologies. For example, the range may be determined within a granularity or range of +/−0.1 meters, and the pose/orientation may be determined within a granularity or range of +/−5 degrees.

Referring to FIG. 3-FIG. 5, in some embodiments, the first device 302 may include various sensors and/or sensing systems. For example, the first device 302 may include an inertial measurement unit (IMU) sensor 312, global positioning system (GPS) 314, etc. The sensors and/or sensing systems, such as the IMU sensor 312 and/or GPS 314 may be configured to generate data corresponding to the first device 302. For example, the IMU sensor 312 may be configured to generate data corresponding to an absolute position and/or pose of the first device 302. Similarly, the GPS 314 may be configured to generate data corresponding to an absolute location/position of the first device 302. The data from the IMU sensor 312 and/or GPS 314 may be used in conjunction with the ranging/position data determined via the UWB devices 308 as described above. In some embodiments, the first device 302 may include a display 316. The display 316 may be integrated or otherwise incorporated in the first device 302. In some embodiments, the display 316 may be separate or remote from the first device 302. The display 316 may be configured to display, render, or otherwise provide visual information to a user or wearer of the first device 302, which may be rendered at least in part on the ranging/position data of the first device 302.

Figure 6:
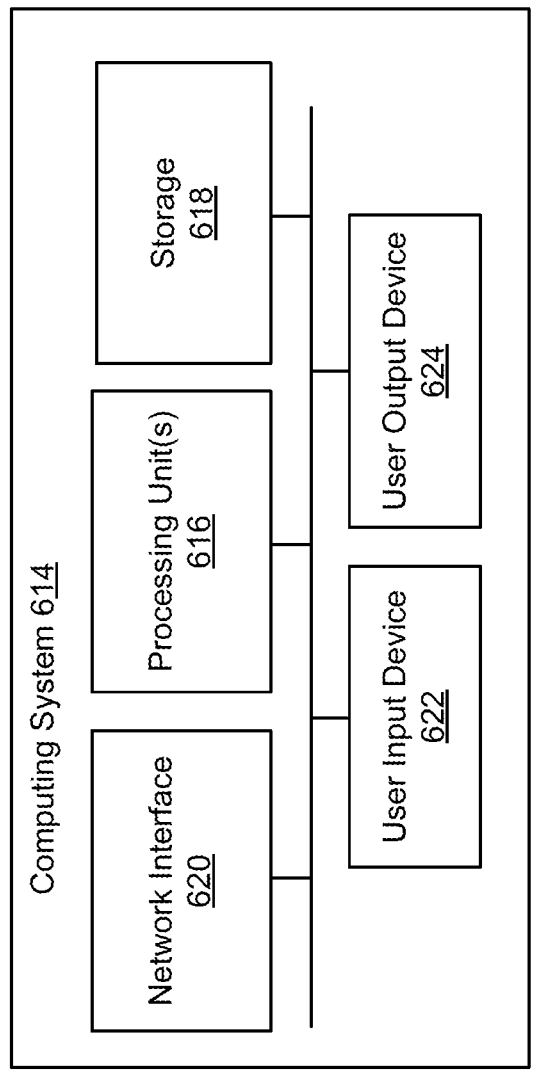
FIG. 6 is a block diagram of a computing environment, according to an example implementation of the present disclosure.

Various operations described herein can be implemented on computer systems. FIG. 6 shows a block diagram of a representative computing system 614 usable to implement the present disclosure. In some embodiments, the computing device 110, the HWD 150, devices 302, 304, or each of the components of FIG. 1-5 are implemented by or may otherwise include one or more components of the computing system 614. Computing system 614 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 614 can be implemented to provide VR, AR, MR experience. In some embodiments, the computing system 614 can include conventional computer components such as processors 616, storage device 618, network interface 620, user input device 622, and user output device 624.

Network interface 620 can provide a connection to a wide area network (e.g., the Internet) to which WAN interface of a remote server system is also connected. Network interface 620 can include a wired interface (e.g., Ethernet) and/or a wireless interface implementing various RF data communication standards such as Wi-Fi, Bluetooth, UWB, or cellular data network standards (e.g., 3G, 4G, 5G, 60 GHz, LTE, etc.).

User input device 622 can include any device (or devices) via which a user can provide signals to computing system 614; computing system 614 can interpret the signals as indicative of particular user requests or information. User input device 622 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 624 can include any device via which computing system 614 can provide information to a user. For example, user output device 624 can include a display to display images generated by or delivered to computing system 614. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 624 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 616 can provide various functionality for computing system 614, including any of the functionality described herein as being performed by a server or client, or other functionality associated with message management services.

It will be appreciated that computing system 614 is illustrative and that variations and modifications are possible. Computer systems used in connection with the present disclosure can have other capabilities not specifically described here. Further, while computing system 614 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Figure 7:
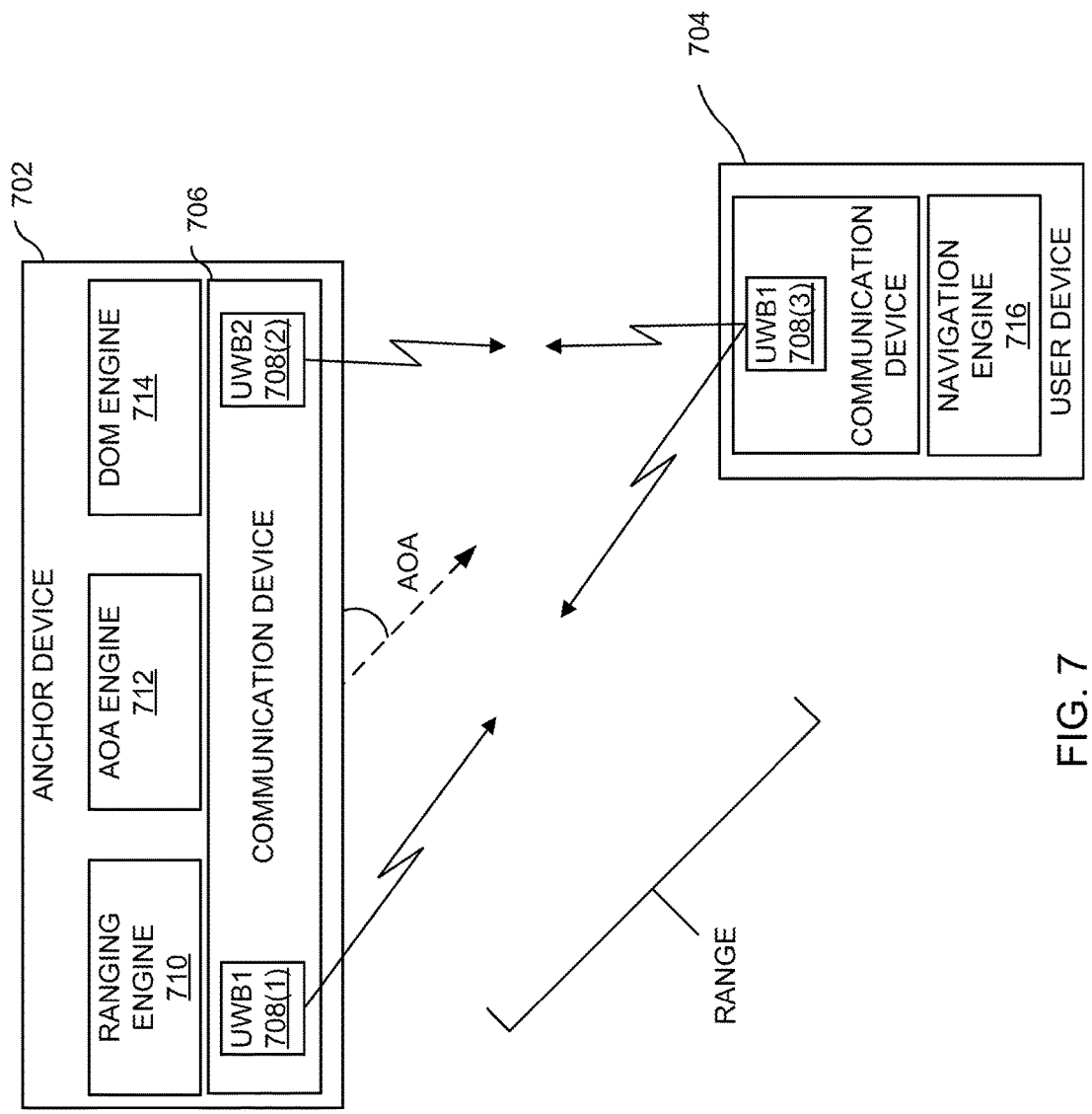
FIG. 7 is a block diagram of a system including a user device and an anchor device, according to an example implementation of the present disclosure.

Referring now to FIG. 7, depicted is an environment 700 including an anchor device 702 and a user device 704, according to an implementation of the present disclosure. The anchor device 702 may be a stationary device relative to the user device 704. For example, the anchor device 702 may be a vehicle or automobile, a fixture in a home, a fixed device located in a mall or grocery store, and so forth. The anchor device 702 may include a communication device 706 including a plurality of UWB devices 708(1), 708(2) (generally referred to as UWB device 708 or UWB devices 708). The communication device 706 including the UWB devices 708 may be similar to the communication device 306 and UWB devices 308 described above with reference to FIG. 3-FIG. 5.

The user device 704 may be a mobile device, a keyfob, a tag or token, etc. Similar to the anchor device 702, the user device 704 may include a communication device 706. In some embodiments, the communication device 706 of the user device 704 may include a single UWB device 708(3). The user device 704 may include a single UWB device 708(3) due to cost or size constraints of the user device 704, for example. The UWB device 708(3) may be similar to the UWB devices 308 described above with reference to FIG. 3-FIG. 5. Since the user device 704 may include a single UWB device 708(3), the user device 704 may typically not be able to determine an angle of arrival (AoA) of the user device 704 relative to the anchor device 702. However, since the anchor device 702 is stationary relative to the user device 704, the anchor device 702 may be configured to compute an AoA of the user device 704 from the anchor device 702, as described in greater detail below. In some embodiments, the communication device 706 of the user device 704 may include a plurality of UWB devices 708 (similar to the anchor device 702).

The user device 704 may be configured to query, instruct, or otherwise request the anchor device 702 to compute an AoA of the user device 704 from the anchor device 702. AoA, as used herein, refers to an angle or direction (e.g., angle or direction approach, motion/movement, orientation) of a first device relative to a second device. The AoA may be determined based on signals exchanged between the two devices. As such, the AoA may be or include an angle or direction of a signal received by a first device from a second device. In some embodiments, the user device 704 may be configured to request the anchor device 702 to compute the AoA of the user device 704 responsive to determining that the user device 704 has moved (e.g., is no longer stationary). In some embodiments, the user device 703 may be configured to request the anchor device 702 to compute the AoA of the user device 704 responsive to the user device 704 being within a UWB range of the anchor device 702. As described in greater detail below, the anchor device 702 may be configured to compute, detect, identify, quantify, or otherwise determine an AoA of the user device 704 from the anchor device 702. The anchor device 702 may be configured to determine the AoA of the user device 704 from the anchor device 702 over or across a plurality of time instances. The anchor device 702 may be configured track or determine a change in the AoA of the user device 704 over or across the time instances. The anchor device 702 may be configured to determine a direction of movement (DOM) of the user device 704 relative to the anchor device 702 based on or according to the change in the AoA of the user device 704 and a change in a range of the user device 704 from the anchor device 702.

The anchor device 702 may include a ranging engine 710. The ranging engine 710 may be or include any device, component, element, and/or hardware configured to detect, quantify, calculate, compute, identify, or otherwise determine a range of the user device 704 from the anchor device 702. More specifically, the ranging engine 710 may be configured to determine a range of the UWB device 708(3) of the user device 704 from a UWB device 708(1), 708(2) of the anchor device 702. The ranging engine 710 may be configured to determine the range of the user device 704 from the anchor device 702 according to or based on a time of flight (TOF) of UWB response signals received from user device 704. The ranging engine 710 may be configured to determine the range of the user device 704 from the anchor device 702 in a manner similar to determining range between the first device 302 and peripheral devices 304 described above with reference to FIG. 3-FIG. 5.

The anchor device 702 may include an AoA engine 712. The AoA engine 712 may be or include any device, component, element, and/or hardware configured to detect, quantify, calculate, compute, identify, or otherwise determine an AoA of the user device 704 from the anchor device 702. The AoA engine 712 may be configured to determine the AoA of the user device 704 from the anchor device 702 according to or based on UWB response signals received by a first and second UWB device 708(1), 708(2) of the anchor device 702 from the UWB device 708(3) of the user device 704. The AoA engine 712 may be configured to determine the AoA of the user device 704 from the anchor device 702 based on a comparison of the time of flight (TOF) of UWB response signals received at the first and second UWB device 708(1), 708(2). The AoA engine 712 may be configured to determine the AoA of the user device 704 from the anchor device 702 based on a phase difference of the UWB response signals received at the first and second UWB device 708(1), 708(2). The AoA engine 712 may be configured to determine the AoA of the user device 704 in a manner similar to determining a pose or orientation of the peripheral device 304 described above with reference to FIG. 5.

The anchor device 702 may include a direction of movement (DOM) engine 714. The DOM engine 714 may be or include any device, component, element, and/or hardware configured to detect, quantify, calculate, compute, identify, or otherwise determine a DOM of the user device 704 relative to the anchor device 702. The DOM engine 714 may be configured to track, identify, monitor, or otherwise determine a change in the range (e.g., determined by the ranging engine 710) and a change in the AoA (e.g., determined by the AoA engine 712) over two or more time instances. The DOM engine 714 may be configured to use the change in the range and change in the AoA for computing, calculating, detecting, or otherwise determining the DOM of the user device 704 relative to the anchor device 702. Various examples and use cases in which the DOM engine 714 determines the DOM of the user device 704 relative to the anchor device 702 are described with reference to FIG. 8A-FIG. 13B.

The user device 704 may include a navigation engine 716. The navigation engine 716 may be or include any device, component, element, and/or hardware configured to generate, determine, or otherwise provide navigation instruction(s) for navigating a user of the user device 704 towards the anchor device 702. In some embodiments, the navigation engine 716 may be configured to provide the navigation instruction(s) based on the DOM (determined by the DOM engine 714) and the AoA (determined by the AoA engine 712). For example, and in some embodiments, the navigation engine 716 may be configured to receive AoA measurements determined by the AoA engine 712 and the DOM determined by the DOM engine 714. The navigation engine 716 may be configured to receive the AoA and DOM measurements in packets received from the anchor device 702 (in the UWB signals, in other wireless transmissions, etc.). The navigation engine 716 may be configured to determine the navigation instruction(s) based on the AoA and DOM measurements. For example, the navigation engine 716 may be configured to determine the navigation instruction(s) by computing a difference between the DOM measurement and most recent AoA. As another example, the navigation engine 716 may be configured to receive the navigation instruction(s) from the anchor device 702. The navigation engine 716 may be configured to provide the navigation instruction(s) to a user of the user device 704. For example, the navigation engine 716 may be configured to render the navigation instruction(s) on a user interface of the user device 704, provide visual or directional queues via one or more lights on the user device 704, and so forth. A user may follow the navigation instruction(s) to navigate from the user's current location towards (e.g., in the direction of) the anchor device 702.

Referring briefly to FIG. 8A-FIG. 13B, depicted are various example use cases where the anchor device 702 may determine the AoA of the user device 704 at various time instances (e.g., at t1, t2, t3, etc.). As a brief overview, the anchor device 702 may determine a first and a second (or subsequent) AoA of the user device 704 at the first and second time instances, and a first and a second (or subsequent) range between the user device 704 and anchor device 702 at the first and second time instances. The anchor device 702 may determine a DOM of the user device 704 based on the first and second AoA and the first and second range. The user device 704 may provide navigation instruction(s) to a user of the user device 704 according to the DOM, to navigate towards the anchor device 702. It is noted that, while described as the anchor device 702 determining the DOM, in some embodiments, the anchor device 702 may transmit, send, or otherwise provide ranging and AoA measurements to the user device 704 to compute or otherwise determine the DOM. Similarly, and in some embodiments, the anchor device 702 and/or the user device 704 may compute, generate, identify, or otherwise determine the navigation instruction(s) for providing (via the user device 704) to the user.

Figure 8B:
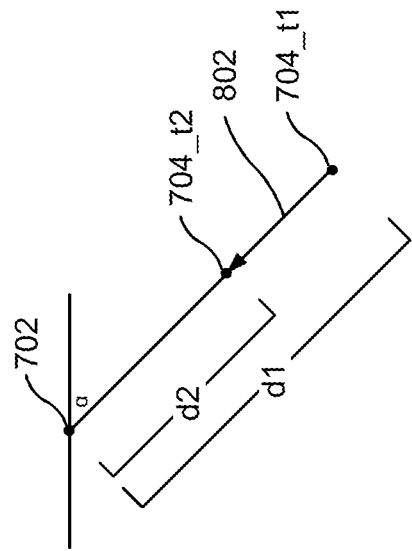
FIG. 8B is a schematic diagram of the use case shown in FIG. 8A, according to an example implementation of the present disclosure.
Figure 8A:
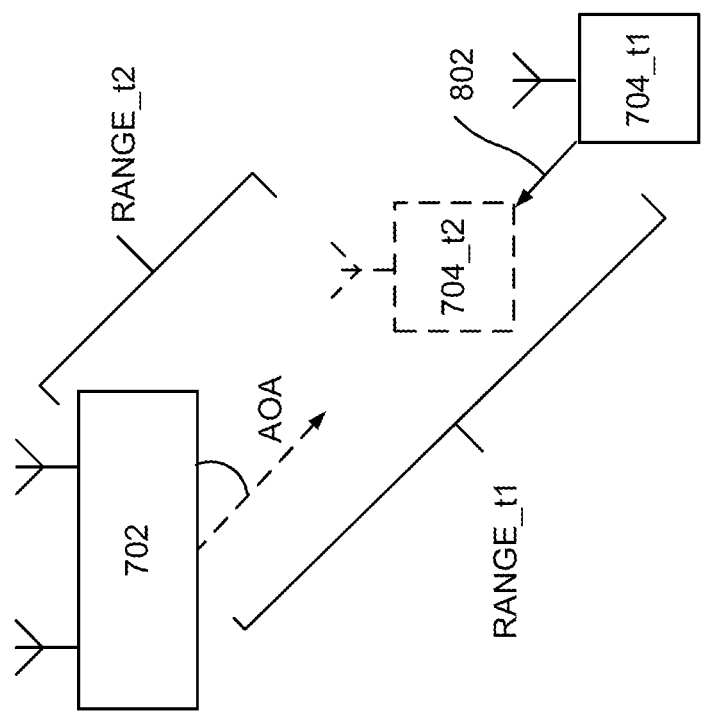
FIG. 8A is a use case of the system of FIG. 7 including the anchor device and user device, according to an example implementation of the present disclosure.

Referring now to FIG. 8A and FIG. 8B, depicted is a use case 800 of the environment 700 including the anchor device 702 and user device 704, and a schematic diagram of the use case 800, respectively, according to an example implementation of the present disclosure. In the example use case shown in FIG. 8A, the user device 704 moves from a first position (e.g., at a first time instance t1) to a second position (e.g., at a second time instance t2) directly towards the anchor device 702. The anchor device 702 may be configured to determine a first range between the user device 704 and the anchor device 702 at the first time instance t1 (e.g., range_t1), and a second range between the user device 704 and the anchor device 702 at the second time instance t2 (range_t2). Additionally, the anchor device 702 may be configured to determine an AoA of the user device 704 relative to the anchor device 702 at the first and second time instance t1, t2. In this example use case 800, the AoA may be the same at both time instances, with the range_t1 being greater than the range_t2. The anchor device 702 may be configured to determine the DOM 802 based on the AoA and ranges at the first and second time instances t1, t2. As shown in the schematic diagram in FIG. 8B, since the AoA is the same at both time instances t1, t2, but the range is decreasing between the first and second time instances t1, t2, the DOM 802 may be a direction towards the anchor device 702. The anchor device 702 and/or user device 704 may be configured to determine navigation instruction(s) to the user to indicate to maintain their current DOM 802. On the other hand, if for instance, the range were increasing from the first time instance t1 to the second time instance t2, but the AoA were the same at both time instances t1, t2, the DOM 802 may correspondingly be in the opposite direction (e.g., away from the anchor device 702). In this example, the anchor device 702 and/or user device 704 may be configured to determine navigation instruction(s) to the user to indicate to turn around 180° to navigate towards the anchor device 702.

In some instances, both the range and the AoA may change between time instances t1, t2. In such instances, the anchor device 702 may be configured to determine the DOM based on the change in the AoA of the user device 704 and the change in distance between the anchor device 702 and the user device 704 at the respective time instances t1, t2. The anchor device 702 and/or user device 704 may be configured to determine or generate navigation instructions based on the DOM, and the user device 704 may provide the navigation instructions for navigating towards the anchor device 702. Additional details regarding these instances and examples are described with reference to FIG. 9A-FIG. 9B and FIG. 10A-FIG. 10B.

Figure 9B:
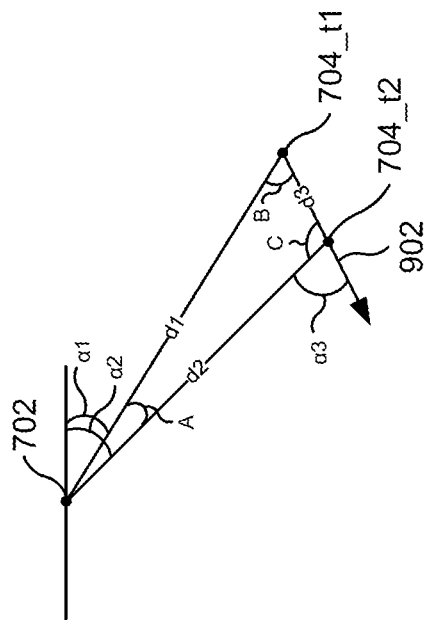
FIG. 9B is a schematic diagram of the use case shown in FIG. 9A, according to an example implementation of the present disclosure.
Figure 9A:
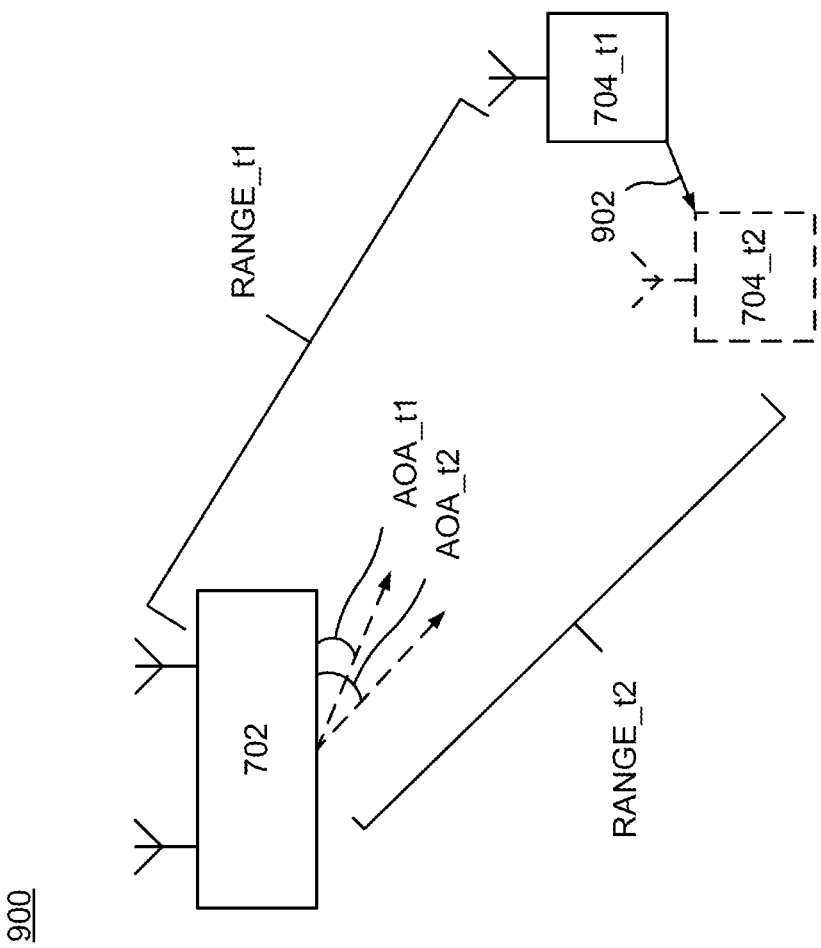
FIG. 9A is a use case of the system of FIG. 7 including the anchor device and user device, according to an example implementation of the present disclosure.

Referring now to FIG. 9A and FIG. 9B, depicted is a use case 900 of the environment 700 including the anchor device 702 and user device 704, and a schematic diagram of the use case 800, respectively, according to an example implementation of the present disclosure. In the example use case shown in FIG. 9A, the user device 704 moves from a first position (e.g., at a first time instance t1) to a second position (e.g., at a second time instance t2). The anchor device 702 may be configured to determine a first range (e.g., distance, separation) between the user device 704 and the anchor device 702 at the first time instance t1 (e.g., range_t1), and a second range between the user device 704 and the anchor device 702 at the second time instance t2 (range_t2). Additionally, the anchor device 702 may be configured to determine an AoA of the user device 704 relative to the anchor device 702 at the first time instance (e.g., AoA_t1), and an AoA of the user device 704 relative to the anchor device 702 at the second time instance t2 (e.g., AoA_t2). In this example use case 900, both the AoA and range may be changing from the first and second time instance t1, t2. As such, the user device 704 is neither moving directly towards nor directly away from the anchor device 702. Rather, the user device 704 may be moving at an angle $\alpha_3$ relative to the anchor device 702.

The anchor device 702 may be configured to determine a DOM 902 based on the range at the first and second time instance t1, t2 (e.g., range_t1 and range_t2), and AoA at the first and second time instance t1, t2 (e.g., AoA_t1 and AoA_t2). Referring specifically to the schematic diagram shown in FIG. 9B, the AoA at the first time instance (e.g., AoA_t1) is represented as $\alpha_1$, the AoA at the second time instance (e.g., AoA_t2) is represented as aa, the range at the first time instance (e.g., range_t1) is represented as $d_1$, the range at the second time instance (e.g., range_t2) is represented as $d_2$. The anchor device 702 may be configured to determine the DOM 902 of the user device 704 relative to the anchor device 702 (represented as $\alpha_3$) based on or according to $\alpha_1$, $\alpha_2$, $d_1$, and $d_2$. In some embodiments, the anchor device 702 may be configured to determine a difference between $\alpha_1$ and as (e.g., $A=\alpha_2-\alpha_2$). The anchor device 702 may be configured to determine a distance ($d_3$) in which the user device 704 traveled/moved between the first and second time instance t1, t2. In some embodiments, the anchor device 702 may be configured to determine the distance $d_3$ according to $d_3^2=d_1^2\ d_2^2-2\cdot d_1\cdot d_2\cdot\cos(A)$. The anchor device 702 may be configured to determine or compute an angle B between $d_1$ and $d_3$. In some embodiments, the anchor device 702 may be configured to determine or compute an angle B according to $B=\sin^{-1}(\sin(A)\ d_2/d_3)$. The anchor device 702 may be configured to determine the DOM 902 (e.g., angle $\alpha_3$) of the user device 704 relative to the anchor device 702 as the sum of the angle A and the angle B. The anchor device 702 and/or user device 704 may configured to determine navigation instruction(s) to the user to indicate to turn around by the angle $\alpha_3$ to navigate towards the anchor device 702.

In some embodiments, the anchor device 702 may be configured to determine the DOM 902 using a selected/ defined equation based on a comparison of the range at the first and second time instances t1, t2. For example, where the range at the second time instance (e.g., range_t2, or $d_2$) is greater than the range at the first time instance (e.g., range_t1, or $d_1$), the anchor device 702 may be configured to determine the DOM 902 as described above. On the other hand, where the range at the second time instance (e.g., range_t2, or $d_2$) is greater than the range at the first time instance (e.g., range_t1, or $d_1$), the anchor device 702 may be configured to determine an angle C between $d_3$ and $d_2$. The anchor device 702 may be configured to determine the angle C according to $C=\sin^{-1}(\sin(A) d_1/d_3)$. In this example, the anchor device 702 may be configured to determine the DOM 902 based on a difference between the 180° and the angle C (e.g., $\alpha_3=180°-C$). In this regard, the DOM 902 may be represented by $\alpha_3$, as the DOM of the user device 704 relative to the anchor device 702. It is noted that, in some embodiments, the anchor device 702 may transmit, send, or otherwise provide ranging and/or AoA measurements/results to the user device 704, for the user device to use, compute, process or otherwise determine the DOM 902.

Figure 10B:
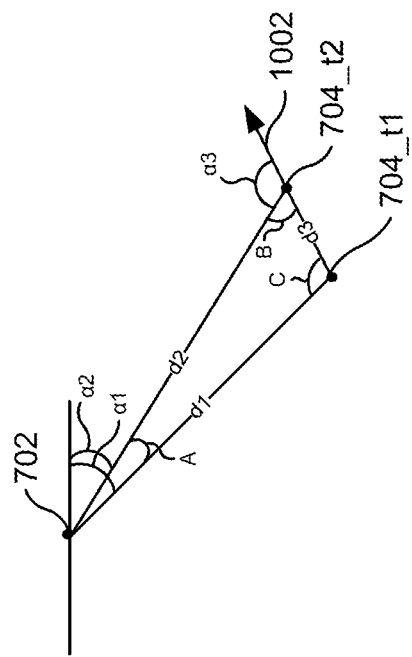
FIG. 10B is a schematic diagram of the use case shown in FIG. 10A, according to an example implementation of the present disclosure.
Figure 10A:
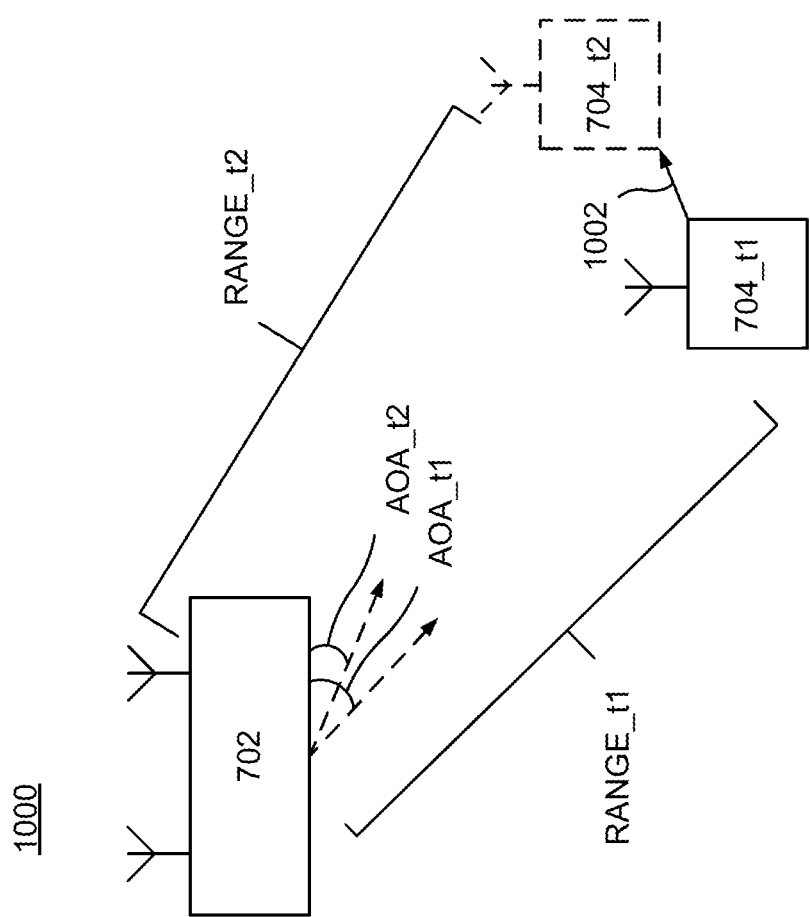
FIG. 10A is a use case of the system of FIG. 7 including the anchor device and user device, according to an example implementation of the present disclosure.

Referring now to FIG. 10A and FIG. 10B, depicted is a use case 1000 of the environment 700 including the anchor device 702 and user device 704, and a schematic diagram of the use case 1000, respectively, according to an example implementation of the present disclosure. In the example use case shown in FIG. 10A, the user device 704 moves from a first position (e.g., at a first time instance t1) to a second position (e.g., at a second time instance t2). The use case 1000 may be similar to the use case 900 shown in FIG. 9A, except that the user device 704 is moving in the opposite direction. Similar to the above example, the anchor device 702 may be configured to determine a first range between the user device 704 and the anchor device 702 at the first time instance t1 (e.g., range_t1), and a second range between the user device 704 and the anchor device 702 at the second time instance t2 (range_t2). Additionally, the anchor device 702 may be configured to determine an AoA of the user device 704 relative to the anchor device 702 at the first time instance (e.g., AoA_t1), and an AoA of the user device 704 relative to the anchor device 702 at the second time instance t2 (e.g., AoA_t2). In this example use case 1000, and according to some embodiments, the anchor device 702 may be configured to assign a value corresponding the DOM 902 based on whether the user device 704 is determined to be moving clockwise or counter-clockwise relative to the anchor device 702. For example, the anchor device 702 may be configured to assign a negative value to the angle A between the first AoA and the second AoA where the user device 704 is determined to be moving clockwise relative to the anchor device 702 (as shown in the use case 900 in FIG. 9A), and a positive value to the angle A between the first AoA and the second AoA where the user device 704 is determined to be moving counter-clockwise relative to the anchor device 702 (as shown in the use case 1000 shown in FIG. 10A). Where the value is reported as negative, the anchor device 702 may be configured to compute the DOM 902 as described above with reference to FIG. 9A and FIG. 9B.

Where the value is reported as positive, the anchor device 702 may be configured to compute or determine the AoA 1002 in a manner similar to computing the DOM 902 as described above with reference to FIG. 9A and FIG. 9B. For example, the anchor device 702 may be configured to determine the distance $d_2$ as described above with reference to FIG. 9A and FIG. 9B. The anchor device may be configured to compute the angle C between the first distance $d_1$ and third distance $d_3$. The anchor device 702 may be configured to determine the angle C according to $C=\sin^{-1}(\sin(A) d_2/d_3)$. The anchor device 702 may be configured to determine the DOM 1002 (e.g., $\alpha_3$) as $\alpha_3=A+C$. Furthermore, and in some instances, where the range at the second time instance (e.g., range_t2, or $d_2$) is greater than the range at the first time instance (e.g., range_t1, or $d_1$), the anchor device 702 may be configured to determine the DOM 1002 as described above. On the other hand, where the range at the second time instance (e.g., range_t2, or $d_2$) is greater than the range at the first time instance (e.g., range_t1, or $d_1$), the anchor device 702 may be configured to determine an angle B between $d_3$ and $d_2$. The anchor device 702 may be configured to determine the angle B according to $C=\sin^{-1}(\sin(A) d_1/d_3)$. In this example, the anchor device 702 may be configured to determine the DOM 1002 based on a difference between the 180° and the angle B (e.g., $\alpha_3=180°-B$). In this regard, the DOM 1002 may be represented by $\alpha_3$, as the DOM of the user device 704 relative to the anchor device 702. It is noted that, in some embodiments, the anchor device 702 may transmit, send, or otherwise provide ranging and/or AoA measurements or results to the user device 704, for the user device to use, compute, process or otherwise determine the DOM 1002.

Figure 11B:
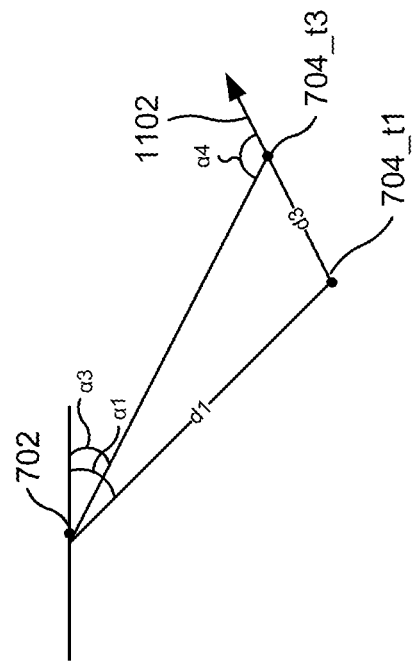
FIG. 11B is a schematic diagram of the use case shown in FIG. 11A, according to an example implementation of the present disclosure.
Figure 11A:
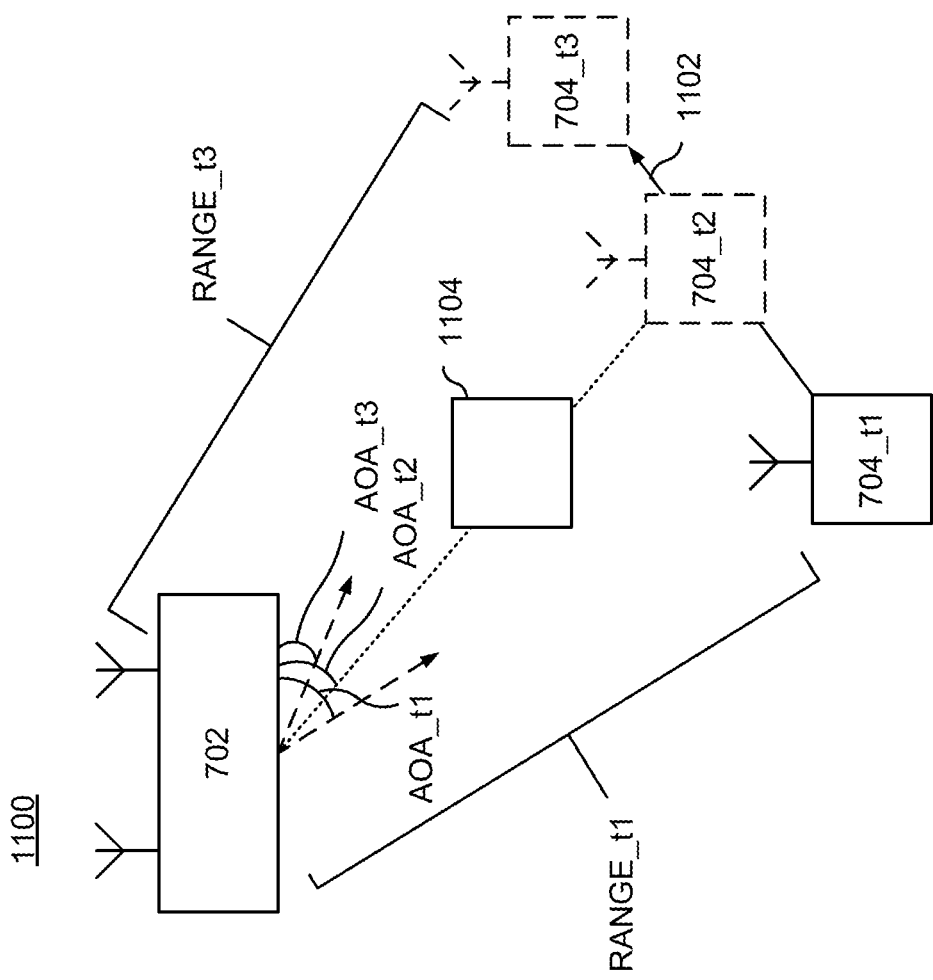
FIG. 11A is a use case of the system of FIG. 7 including the anchor device and user device, according to an example implementation of the present disclosure.

Referring now to FIG. 11A and FIG. 11B, depicted is a use case 1100 of the environment 700 including the anchor device 702 and user device 704, and a schematic diagram of the use case 1100, respectively, according to an example implementation of the present disclosure. In the example use case 1100 shown in FIG. 11A, the user device 704 moves from a first position (e.g., at a first time instance t1) to a second position (e.g., at a second time instance t2), and from the second position to a third position (e.g., at a third time instance t3). The anchor device 702 may be configured to determine the DOM 1102 of the user device 704 relative to the anchor device 702 in a manner similar to DOM 902 and DOM 1002 as described above with reference to FIG. 9A-FIG. 10B, respectively. However, an obstruction 1104 may be located in the environment which block, inhibit, obstruct, or otherwise impair measurement data between the anchor device 702 and user device 704. In the example use case 1100, the obstruction 1104 may be located between measurements obtained or captured between the anchor device 702 and user device 704 at the second time instance t2.

In some embodiments, the anchor device 702 may be configured to measure a time duration between first UWB data (e.g., the UWB response signal) received at the first time instance and a current time. If the time duration exceeds a predetermined threshold, the anchor device 702 may be configured to skip, omit, or otherwise not use measurement data obtained at the second time instance t2, and instead wait until the third time instance t3 to compute or determine the DOM 1102 for the user device 704. In some instances, the anchor device 702 may receive second UWB data (e.g., the UWB response signal) from the user device 704 at the second time instance t2. The anchor device 702 may be configured to compare a received signal strength indicator (RSSI) of the first UWB data to the second UWB data. The anchor device 702 may be configured to disregard, skip, omit, or otherwise not use the second UWB data responsive to the RSSI of the second UWB data being a predetermined threshold less than the RSSI of the first UWB data. For example, the predetermined threshold may be greater than a 5 dB loss in RSSI. Where the anchor device 702 determines not to use any data at the second time instance t2, the anchor device 702 may use the AoA and range of the user device 704 relative to the anchor device 702 at the third time instance t3 as described above with reference to FIG. 9A-FIG. 10B. For example, the anchor device 702 may determine the DOM 1102 of the user device 704 at the third time instance (e.g., 704_t3) by computing the angle $\alpha_4$ in a manner as described above with reference to FIG. 10A and FIG. 10B. Such implementations and embodiments may ensure accurate UWB data is used for computing or calculating the DOM 902 of the user device 704, particularly where obstructions 1104 are located in the environment. Although RSSI is discussed herein, this is by way of illustration and not intended to be limiting, so that other metrics for signal strength/quality may be used instead.

Figure 12B:
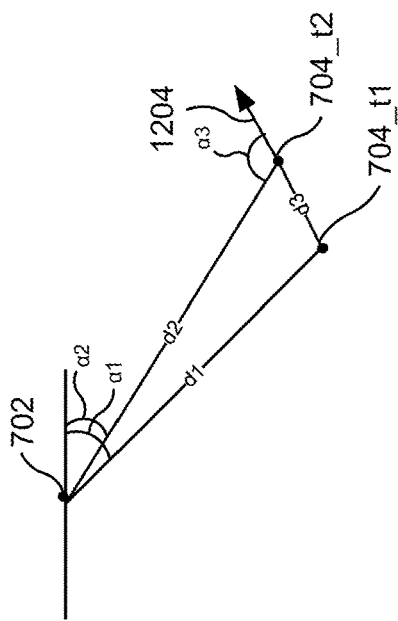
FIG. 12B is a schematic diagram of the use case shown in FIG. 12A, according to an example implementation of the present disclosure.
Figure 12A:
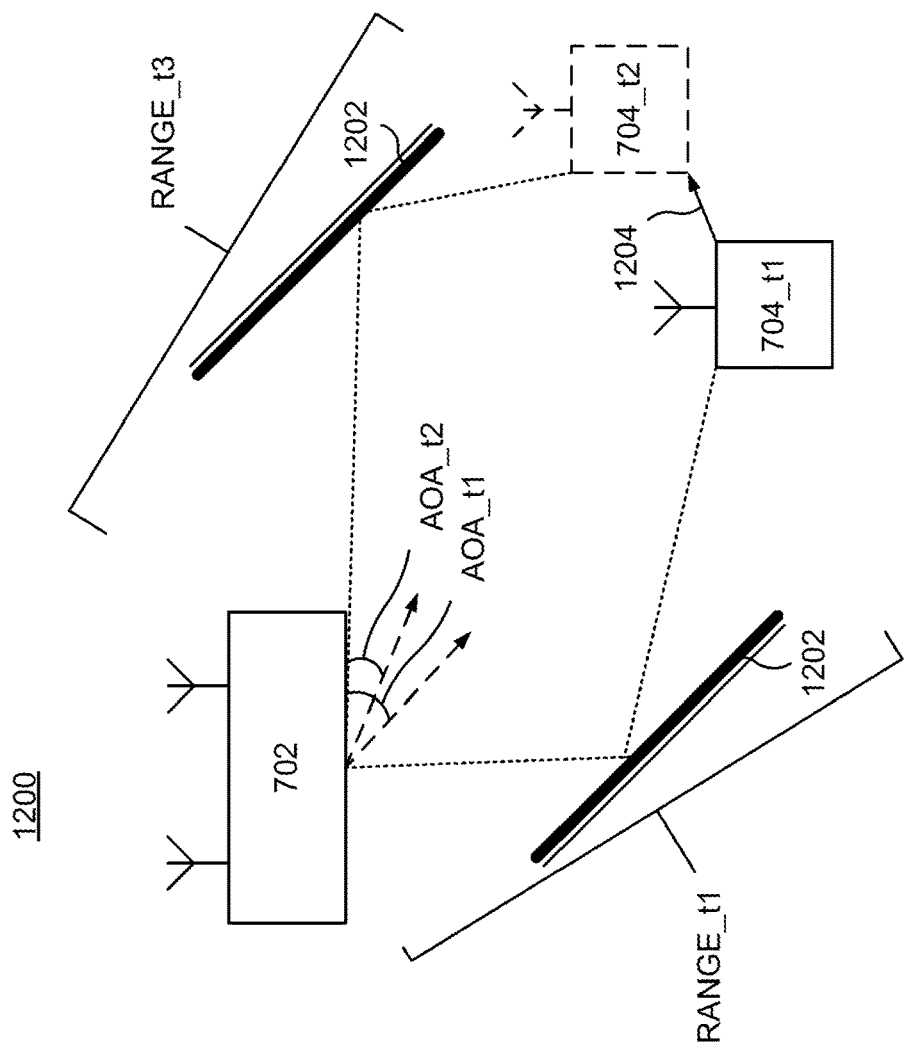
FIG. 12A is a use case of the system of FIG. 7 including the anchor device and user device, according to an example implementation of the present disclosure.

Referring now to FIG. 12A and FIG. 12B, depicted is a use case 1200 of the environment 700 including the anchor device 702 and user device 704, and a schematic diagram of the use case 1200, respectively, according to an example implementation of the present disclosure. In the example use case 1200 shown in FIG. 12A, the user device 704 moves from a first position (e.g., at a first time instance t1) to a second position (e.g., at a second time instance t2. The environment may include one or more walls 1202 which reflect, refract, or otherwise form multiple paths (shown as dotted-lines) for the UWB data at the first and second time instances t1, t2. In some embodiments, the anchor device 702 may be configured to compute, detect, or otherwise determine a plurality of AoAs of the user device 704 relative to the anchor device 702 at each time instance t1, t2. For example, the anchor device 702 may be configured to compute a first AoAs of the user device 704 relative to the anchor device 702 based on or according to a phase difference (e.g., a phase difference of arrival [PDOA]) of the UWB response signal for each path received at respective UWB devices 308(1), 308(2) of the anchor device 702. In some embodiments, the anchor device 702 may also compute a second AoA of the user device 704 relative to the anchor device 702 based on or according to a time difference (e.g., a time difference of arrival [TDOA]) of the UWB response signal received at the respective UWB devices 308(1), 308(2) of the anchor device 702. The anchor device 702 may be configured to determine the AoA at the first time instance (e.g., AoA_t1) based on a comparison of the first AoAs and the second AoA. For example, the anchor device 702 may be configured to determine which AoA of the first AoAs is closest to the second AoA. The anchor device 702 may be configured to select one of the first AoAs (e.g., which is closest to the second AoA) as the AoA at the first time instance (AoA_t1). In some embodiments, the anchor device 702 may be configured to compute a plurality of second AoAs, and compute an average second AoA using the plurality of second AoAs. The anchor device 702 may be configured to compare the average second AoA to the first AoAs to determine the AoA at the first time instance. The anchor device 702 may be configured to determine first and second AoAs for the second time instance in a similar manner.

Such implementations and embodiments may provide for more robust determination of AoA of the user device 704 relative to the anchor device 702, particularly in instances where the environment includes walls or other objects which induce multiple paths of UWB signals sent between the devices 702, 704. Additionally, while described as using both TDOA and PDOA, in some implementations, the anchor device 702 may be configured to select or otherwise determine the AoA using one of TDOA or PDOA. For example, the anchor device 702 may use the PDOA of different phases of the UWB response signals received from the user device 704 for selecting which UWB response signal to use for determining the AoA. The anchor device 702 may use the PDOA since the measured or determined phase difference could be drastically different where multiple paths of UWB signals are received, whereas a measured time difference could be on the order of micro or pico-seconds. By using PDOA as a basis for selecting or determining the AoA, the anchor device 702 may have increased accuracy and precision in determining which signal phase corresponds to the actual AoA of the user device 704 relative to the anchor device 702.

Following the selection of which AoAs to use at the respective time instances, the anchor device 702 may be configured to determine the DOM 1204 based on the determined or selected AoA at the first time instance (e.g., for the user device 704 at the first time instance, or 704_t1) and the determined or selected AoA at the second time instance (e.g., for the user device 704 at the second time instance, or 704_t2). The anchor device 702 may be configured to determine the DOM 1204 by computing the angle $\alpha_3$ in a manner as described above with reference to FIG. 10A and FIG. 10B.

Figure 13A:
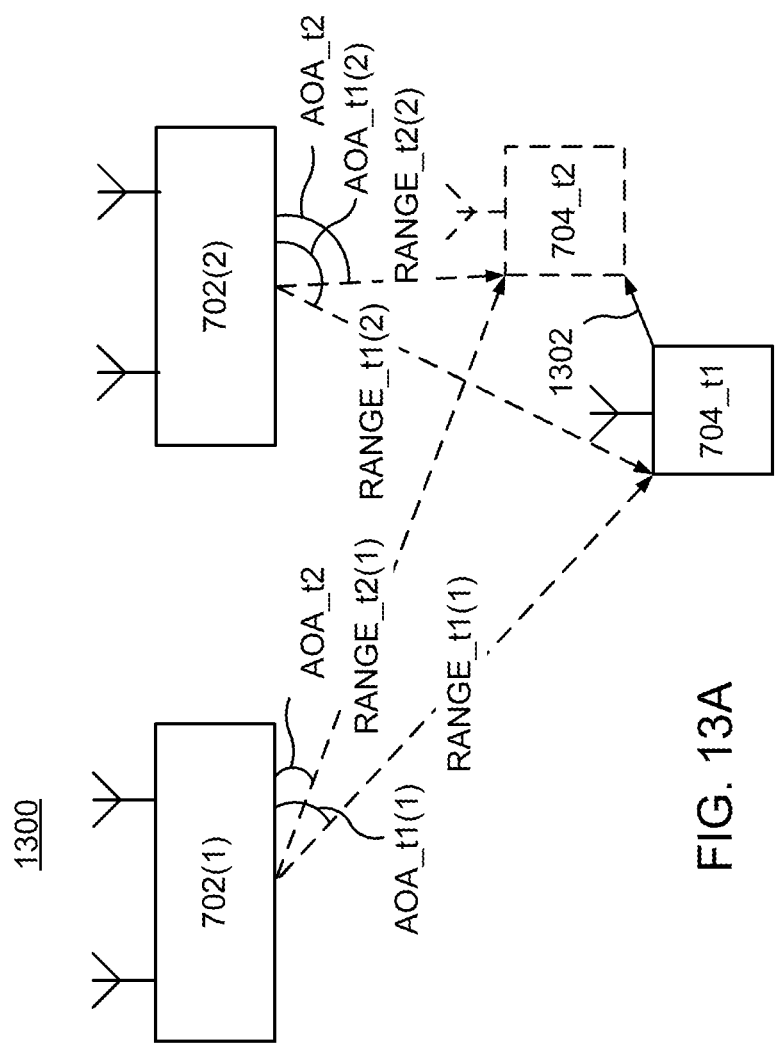
FIG. 13A is a use case of the system of FIG. 7 including the anchor device and user device, according to an example implementation of the present disclosure.
Figure 13B:
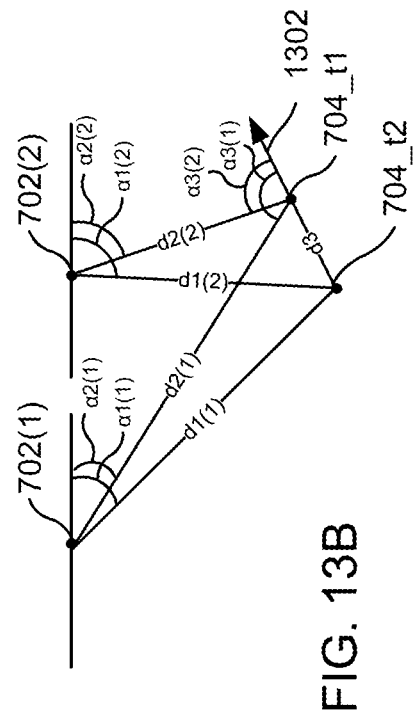
FIG. 13B is a schematic diagram of the use case shown in FIG. 13A, according to an example implementation of the present disclosure.

Referring now to FIG. 13A and FIG. 13B, depicted is a use case 1300 of the environment 700 including a plurality of anchor devices 702(1), 702(s) and the user device 704, and a schematic diagram of the use case 1300, respectively, according to an example implementation of the present disclosure. In the example use case 1300 shown in FIG. 13A, the anchor devices 702(1), 702(2) may be mounted or otherwise coupled to the same object or fixture (e.g., at different portions of a vehicle, for instance). In this example, the anchor devices 702(1), 702(2) may both compute the DOM 1302 of the user device 704 relative to the anchor devices 702(1), 702(2) as described above with reference to FIG. 10A and FIG. 10B (e.g., by determining the angle $\alpha_{3(1)}$ and the angle $\alpha_{3(2)}$ for the user device 704 at the second time instance, or at 704_t2). In some embodiments, the anchor devices 702(1), 702(2) may be configured to determine the DOM 1302 based on an RSSI of signals used by the first anchor device 702(1) to compute the DOM 1302 in comparison to an RSSI of signals used by the second anchor device 702(2) to compute the DOM 1302. For example, the anchor devices 702(1), 702(2) may disregard, ignore, or otherwise not use the DOM 1302 computed by whichever of the anchor device 702(1), 702(2) using signals having a lower RSSI value. In some embodiments, the anchor devices 702(1), 702(2) may be configured to determine the DOM 1302 based on a weighted average of the DOM 1302 computed by the first and second anchors 702(1), 702(2). The average may be weighted according to the relative RSSI value (e.g., to more heavily weight the DOM 1302 computed based on signals having a higher RSSI value). In some embodiments, the average may be weighted according to a distance measurement variance (e.g., a variance between distance d1 and distance d2 for the first and second anchors 701(1), 701(2)). For example, the average may be weighted such that a smaller distance measurement variance is more heavily weighted.

It is noted that, while two anchor devices 702(1), 702(2) are shown, in some embodiments, any number of anchor devices 702 may be included. Such implementations and embodiments may provide diversity in computing the DOM 1302, as well as improving performance.

Referring now to FIG. 14, depicted is a flowchart showing a method 1400 of angle-of-arrival determination in wireless devices, according to an example implementation of the present disclosure. As a brief overview, at step 1402, a device determines a first angle-of-arrival (AoA) and a first distance. At step 1404, the device determines a second AoA and a second distance. At step 1406, the device determines a direction of movement. The method 1400 may be performed by one or more of the devices or components described above with reference to FIG. 1-FIG. 13 (such as the computing device 110, HWD 150, devices 302, 304, or devices 702, 704). For example, where the method 1400 is performed by the anchor device 702, the anchor device 702 may determine the first AoA and first distance (and/or the second AoA and the second distance) by computing the first AoA and the first distance using UWB response signals received from the user device 704. The anchor device 702 may then determine the direction of movement by performing computations as described above using the computed first and second AoAs, and the computed first and second distances. Similarly, where the method 1400 is performed by the user device 704, the user device 704 may determine the first AoA and the first distance (and/or the second AoA and the second distance) based on data/results/measurements received from the anchor device 702. For example, the user device 704 may receive timing signals corresponding to the UWB response signals received at the anchor device 702 from the anchor device 704, and the user device 704 may compute the AoA based on the timing signals. As another example, the user device 704 may receive a packet or other data identifying/providing/reporting the AoAs and/or distances from the anchor device 702, and the user device 704 may determine the first and second AoA and/or the first and second distance by identifying the AoAs and the distances included in the data received from the anchor device 702. Accordingly, the method 1400 may be performed by either the anchor device 702 or the user device 704, according to various embodiments described herein.

In further detail, at step 1402, a device determines a first angle-of-arrival (AoA) and a first distance. In some embodiments, the device may determine the first AoA and the first distance between a user device and an anchor device. The device may determine the first AoA and the first distance at a first time instance. In some embodiments, the device may determine the first AoA and the first distance according to first measurements between a single ultra-wideband (UWB) antenna of the user device and a plurality of UWB antennas of the anchor device. In some embodiments, the device may determine the first AoA and first distance responsive to one of the user device and/or anchor device triggering the determination. For example, a user of the user device may select a button or option on the user device to trigger the determination, to receive navigation instruction(s) for navigating towards the anchor device. In some embodiments, the device may determine the first AoA and the first distance responsive to the user device being within range of the anchor device. In some embodiments, the device may be the anchor device (e.g., the anchor device may determine the first AoA and the first distance). In some embodiments, the device may be the user device (e.g., the user device may receive the first measurements and determine the AoA and distance, or the user device may receive the AoA and distance received from the anchor device).

In some embodiments, the device may determine a first candidate AoA and a second candidate AoA corresponding to different UWB signal paths. The first measurements may include measurements corresponding to multiple UWB signals having multiple paths. For instance, the multiple UWB signals may correspond to a UWB signal transmitted from a single source, with the UWB signal reflecting, refracting, or otherwise bouncing off various surfaces in the environment to produce the multiple UWB signals. The device may determine a first phase difference of arrival (PDOA) corresponding to the first candidate AoA, and a second PDOA corresponding to the second candidate AoA. The device may determine the first PDOA corresponding to the first candidate AoA based on a time difference between a respective UWB signal of the multiple UWB signals being received at first and second UWB antennas of the anchor device. In some embodiments, the device may determine the first AoA by selecting the first candidate AoA or the second candidate AoA according to the first PDOA and the second PDOA. In some embodiments, the device may determine the first (and/or second) PDOA based on an average of at least two PDOA values corresponding to the first candidate AoA. For example, the device may compute an average of a first PDOA for a first UWB signal of the multiple UWB signals and a second PDOA for a second UWB signal of the multiple UWB signals.

At step 1404, the device determines a second AoA and a second distance. In some embodiments, the device may determine the second AoA and the second distance between the user device and the anchor device at a second time instance. The device may determine the second AoA and the second distance according to second measurements between the single UWB antenna of the user device and the plurality of UWB antennas of the anchor device. Step 1404 may be similar to step 1402 described above. In some embodiments, the device may determine the second AoA and the second distance at a predetermined interval (e.g., a number of milliseconds, a number of seconds, etc.) following determining the first AoA and the first distance. In this regard, the device may determine AoAs and distances between the user device and anchor device at various intervals.

In some embodiments, the device may receive third measurements at a third time instance between the first and second time instances. The device may determine, detect, or otherwise identify a signal strength of the first, second, and/or third measurements. For example, the device may identify a received signal strength indicator (RSSI) of the first measurements, the second measurements, and the third measurements. The device may determine whether the signal strength of the third measurements is lower than a signal strength of the first or second measurements by at least a defined or predetermined amount. For example, the defined amount may be or include greater than a 5 dB loss/reduction/difference. Where the device determines that the signal strength of the third measurements is lower than a signal strength of the first or second measurements by the defined amount, the device may disregard, ignore, not use, or otherwise discard the third measurements.

At step 1406, the device determines a direction of movement. In some embodiments, the device may determine the direction of movement of the user device relative to the anchor device. The device may determine the direction of movement according to the first AoA, the first distance, the second AoA, and the second distance. The device may determine the direction of movement as described above with reference to FIG. 8A-FIG. 13B. In some embodiments, the device may determine a value indicative of the direction of movement, according to a change between the first AoA and the second AoA. For example, the device may determine the value based on whether the change between the first AoA and the second AoA indicates that the user device is moving clockwise (or counter-clockwise) relative to the anchor device. The device may assign the value to the AoA (or to a difference between the first AoA and the second AoA). The device may determine the direction of movement based on or according to the value (as described above with reference to FIG. 9A-FIG. 10B).

In some embodiments, the anchor device may be a first anchor device of a plurality of anchor devices. The device may determine the direction of movement for both the first and second anchor devices. For example, the device may determine a second direction of movement of the user device relative to a second anchor device located apart from the first anchor device. The device may determine the second direction of movement as described above with reference to steps 1402-1406. In some embodiments, the device may determine an angle from the user device towards the first anchor device and the second anchor device. In some embodiments, the device may determine the angle towards the first anchor device and the second anchor device by calculating a weighted average of a first angle and a second angle corresponding to the first and second directions of movement respectively. In some embodiments, the device may determine the angle towards the first anchor device and the second anchor device selecting one of the first angle and the second angle.

In some embodiments, the device may provide a navigational instruction for navigating towards the anchor device, according to the determined direction of movement. For example, where the device is the anchor device, the anchor device may transmit the navigational instruction to the user device for rendering (or otherwise providing) to the user. As another example, where the device is the user device, the user device may determine the navigational instruction for rendering or providing to the user, and correspondingly render or provide the navigational instruction. The navigational instruction may correspond to the direction of movement. For example, the navigational instruction may include an angle in which the user is to move for the direction of movement to be directed towards the anchor device. The navigation instruction may correspond to angle $\alpha_3$ described above with reference to FIG. 9-FIG. 13. For example, the navigation instruction may include instructions to rotate or otherwise travel in a different direction, with the different direction being equal to the angle.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
   determining, by one or more processors, a first angle of arrival (AoA) and a first distance between a user device and an anchor device at a first time instance, according to first measurements between a single ultra-wideband (UWB) antenna of the user device and a plurality of UWB antennas of the anchor device;
   determining, by the one or more processors, a second AoA and a second distance between the user device and the anchor device at a second time instance, according to second measurements between the single UWB antenna of the user device and the plurality of UWB antennas of the anchor device; and
   determining, by the one or more processors, a direction of movement of the user device relative to the anchor device, according to the first AoA, the first distance, the second AoA, and the second distance.

2. The method of claim 1, further comprising providing, by the one or more processors, a navigational instruction for navigating towards the anchor device, according to the determined direction of movement.

3. The method of claim 1, wherein the anchor device comprises the one or more processors, or the user device comprises the one or more processors.

4. The method of claim 1, wherein the anchor device is stationary.

5. The method of claim 1, further comprising determining, by the one or more processors, a value indicative of the direction of movement, according to a change between the first AoA and the second AoA.

6. The method of claim 1, further comprising determining, by the one or more processors, an angle from the user device towards the anchor device according to the direction of movement.

7. The method of claim 1, further comprising:
   receiving, by the one or more processors, third measurements at a third time instance between the first time instance and the second instance;
   determining, by the one or more processors, that a signal strength from the third measurements is lower than that from at least one of the first measurements or the second measurements, by at least a defined amount; and
   discarding, by the one or more processors, the third measurements responsive to determining that the signal strength is lower by at least the defined amount.

8. The method of claim 1, further comprising:
   determining, by the one or more processors according to the first measurements, a first candidate AoA and a second candidate AoA corresponding to different UWB signal paths;

determining, by the one or more processors, a first phase difference of arrival (PDOA) corresponding to the first candidate AoA, and a second PDOA corresponding to the second candidate AoA; and determining, by the one or more processors, the first AoA, by selecting the first candidate AoA or the second candidate AoA according to the first PDOA and the second PDOA.

9. The method of claim 8, wherein determining the first PDOA comprises:
determining, by the one or more processors, an average of at least two PDOA values corresponding to the first candidate AoA.

10. The method of claim 1, wherein the direction of movement is a first direction of movement, and the anchor device is a first anchor device, the method further comprising:
determining, by the one or more processors, a second direction of movement of the user device relative to a second anchor device located apart from the first anchor device; and
determining, by the one or more processors, an angle from the user device towards the first anchor device and the second anchor device, by calculating a weighted average of a first angle and a second angle corresponding to the first and second directions of movement respectively, or selecting one of the first angle and the second angle.

11. A user device comprising:
a single ultra-wideband (UWB) antenna; and
one or more processors configured to:
determine a first angle of arrival (AoA) and a first distance between the user device and an anchor device at a first time instance, according to first measurements between the single UWB antenna and a plurality of UWB antennas of the anchor device;
determine a second AoA and a second distance between the user device and the anchor device at a second time instance, according to second measurements between the single UWB antenna and the plurality of UWB antennas of the anchor device; and
determine a direction of movement of the user device relative to the anchor device, according to the first AoA, the first distance, the second AoA, and the second distance.

12. The user device of claim 11, wherein the one or more processors are further configured to provide a navigational instruction for navigating towards the anchor device, according to the determined direction of movement.

13. The user device of claim 11, wherein the one or more processors are further configured to determine a value indicative of the direction of movement according to a change between the first AoA and the second AoA.

14. The user device of claim 11, wherein the one or more processors are further configured to determine an angle from the user device towards the anchor device according to the direction of movement.

15. The user device of claim 11, wherein the one or more processors are further configured to:
receive third measurements at a third time instance between the first time instance and the second instance;
determine that a signal strength from the third measurements is lower than that from at least one of the first measurements or the second measurements, by at least a defined amount; and
discard the third measurements responsive to determining that the signal strength is lower by at least the defined amount.

16. The user device of claim 11, wherein the one or more processors are further configured to:
determine, according to the first measurements, a first candidate AoA and a second candidate AoA corresponding to different UWB signal paths;
determine a first time difference of arrival (TDOA) corresponding to the first candidate AoA, and a second TDOA corresponding to the second candidate AoA; and
determine the first AoA, by selecting the first candidate AoA or the second candidate AoA according to the first TDOA and the second TDOA.

17. The user device of claim 11, wherein the one or more processors are further configured to determine the first PDOA by: determining an average of at least two PDOA values corresponding to the first candidate AoA.

18. The user device of claim 11, wherein the direction of movement is a first direction of movement and the anchor device is a first anchor device, wherein the one or more processors are further configured to:
determine a second direction of movement of the user device relative to a second anchor device located apart from the first anchor device; and
determine an angle from the user device towards the first anchor device and the second anchor device, by calculating a weighted average of a first angle and a second angle corresponding to the first and second directions of movement respectively, or selecting one of the first angle and the second angle.

19. A non-transitory computer readable medium storing instructions that, when executed by one or more processors, cause the one or more processors to:
determine a first angle of arrival (AoA) and a first distance between a user device and an anchor device at a first time instance, according to first measurements between the single ultra-wideband (UWB) antenna of the user device and a plurality of UWB antennas of the anchor device;
determine a second AoA and a second distance between the user device and the anchor device at a second time instance, according to second measurements between the single UWB antenna of the user device and the plurality of UWB antennas of the anchor device; and
determine a direction of movement of the user device relative to the anchor device, according to the first AoA, the first distance, the second AoA, and the second distance.

20. The non-transitory computer readable medium of claim 19, wherein the instructions further cause the one or more processors to:
provide a navigational instruction for navigating towards the anchor device, according to the determined direction of movement.

* * * * *